(12) United States Patent
Kavakka et al.

(10) Patent No.: US 10,480,039 B2
(45) Date of Patent: Nov. 19, 2019

(54) METHOD FOR TREATING LIGNOCELLULOSIC MATERIALS

(71) Applicant: Stora Enso OYJ, Helsinki (FI)

(72) Inventors: Jari Kavakka, Stockholm (SE); Mari Granström, Kerava (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 15/548,166

(22) PCT Filed: Feb. 1, 2016

(86) PCT No.: PCT/IB2016/050496
§ 371 (c)(1),
(2) Date: Aug. 2, 2017

(87) PCT Pub. No.: WO2016/125067
PCT Pub. Date: Aug. 11, 2016

(65) Prior Publication Data
US 2018/0016649 A1 Jan. 18, 2018

(30) Foreign Application Priority Data
Feb. 3, 2015 (SE) ........................ 1550109

(51) Int. Cl.
*C13K 13/00* (2006.01)
*B01D 9/00* (2006.01)
(Continued)

(52) U.S. Cl.
CPC ............ *C13K 13/002* (2013.01); *B01D 9/004* (2013.01); *B01D 9/0018* (2013.01);
(Continued)

(58) Field of Classification Search
None
See application file for complete search history.

(56) References Cited

U.S. PATENT DOCUMENTS 6,709,527 B1 * 3/2004 Fechter .................. C13B 20/00
127/46.2
2009/0090894 A1 4/2009 Wang et al.
(Continued)

FOREIGN PATENT DOCUMENTS

EP 0018621 A1 11/1980
RU 2473356 C1 1/2013
WO WO-2013166469 A2 * 11/2013 ......... B01D 15/1821

OTHER PUBLICATIONS

RU2473356, English translation (Year: 2013).*
(Continued)

*Primary Examiner* — Melvin C. Mayes
*Assistant Examiner* — Stefanie J Cohen
(74) *Attorney, Agent, or Firm* — Greer, Burns & Crain, Ltd.

(57) ABSTRACT

A method of generating a refined sugar stream that comprises xylose from a biomass hydrolysis solution, including contacting a biomass hydrolysis solution that includes a population of mixed sugars comprising xylose, an acid, and impurities, with a thermally-phase separable solvent such as a glycol solvent to form an extraction mixture; and separating from said extraction mixture a first stream including the thermally-phase separable solvent, acid, and impurities and a second, refined sugar stream that comprises xylose. The thermally-phase separable solvent is an ethylene glycol or a propylene glycol ether, such as 2-butoxyethanol or 1-propoxy-propanol or any combination thereof.

14 Claims, 13 Drawing Sheets

The chromatogram of pre-hydrolysis mixture after PP extraction using recycled solvent.

(51) Int. Cl.
*B01D 11/04* (2006.01)
*B01D 15/18* (2006.01)
*B01D 15/36* (2006.01)

(52) U.S. Cl.
CPC ...... *B01D 11/0492* (2013.01); *B01D 15/1821* (2013.01); *B01D 15/362* (2013.01); *B01D 15/363* (2013.01); *B01D 11/04* (2013.01)

(56) References Cited

U.S. PATENT DOCUMENTS

2009/0291481 A1* 11/2009 Hillyer ................. C12P 7/06
435/163
2012/0301948 A1 11/2012 Brennan et al.

OTHER PUBLICATIONS

International Search Report for PCT/IB2016/050946, dated May 26, 2016.
U.S. Appl. No. 15/548,160 entitled "Method for Treating Lignocellulosic Materials", Inventor: Kavakka, Jari et al., filed Aug. 2, 2017.

* cited by examiner

METHOD FOR TREATING LIGNOCELLULOSIC MATERIALS

This application is a U.S. National Stage under 35 U.S.C. § 371 of International Application No. PCT/IB2016/050496, filed Feb. 1, 2016, which claims priority to Swedish Patent Application No. 1550109-1, filed Feb. 3, 2015.

BACKGROUND OF THE INVENTION

Currently, sugar solutions are purified with extraction and/or chromatographic techniques or combinations thereof. Chromatographic techniques, although well developed, pose maintenance challenges when operating at an industrial level. Several extraction techniques are commonly used as early purification steps but further purification is required to obtain high purity (>80%) sugar fractions. Such extraction techniques are often conducted by combining solvents, such as alkanols, and extractants, such as amines, with chromatographic techniques, such as Simulated Moving Bed (SMB) or Sequential Simulated Moving Bed (SSMB) chromatography. Exemplary approaches are described in WO2012061085. Provided herein are procedures that simplify the sugar purification process by decreasing the need for many steps utilized in conventional approaches.

SUMMARY OF THE INVENTION

A method of generating a refined a sugar stream that includes xylose from a biomass hydrolysis solution is disclosed. The method includes contacting a biomass hydrolysis solution that includes a population of mixed sugars, including oligomeric sugars and, monomeric sugars, preferably xylose, an acid, and impurities, with a thermally phase-separable extractant, e.g., an ethylene glycol or a propylene glycol ether, such as 2-butoxyethanol, or 1-propoxy-2-propanol, or any combination thereof, to form an extraction mixture; and separating from said extraction mixture a first stream that includes the chosen glycol solvent or solvents, acid and impurities and a second, refined sugar stream, preferably a sugar stream comprising xylose.

The extraction mixture itself comprises a biomass hydrolysis solution that includes a population of mixed sugars, including monomeric and oligomeric sugars, preferably enriched in xylose, an acid, and impurities, and a thermally phase-separable extractant. In one alternative, the thermally phase-separable extractant is an ethylene glycol or a propylene glycol ether, such as 2-butoxyethanol (EB), or 1-propoxy-2-propanol (PP), or any combination thereof.

Some of the alternatives described herein concern methods of generating a refined a sugar stream that comprises xylose from a biomass hydrolysis solution. Some approaches include the steps of: (i) contacting a biomass hydrolysis solution that comprises a population of mixed sugars comprising xylose, an acid, e.g., HCl or $H_2SO_4$, and impurities, with a thermally-phase separable solvent, e.g., an ethylene glycol or a propylene glycol ether, such as 2-butoxyethanol, or 1-propoxy-2-propanol, or any combination thereof, so as to form an extraction mixture; and (ii) separating from said extraction mixture a first stream comprising the thermally-phase separable solvent, acid, and impurities and a second, refined sugar stream that comprises xylose. In some alternatives, the method includes contacting a stream from said biomass hydrolysis solution, which comprises said population of mixed sugars comprising xylose with a strong acid cation exchange resin, preferably prior to step (i). In some alternatives, the method includes contacting a stream from said biomass hydrolysis solution, which comprises said population of mixed sugars comprising xylose, with a weak base anion exchange resin, preferably after said stream is contacted with said strong acid cation exchange resin and prior to step (i). In some alternatives, the method includes heating said extraction mixture to a temperature of 30-100° C. In some alternatives, the method further includes separating said second, refined sugar stream that comprises xylose by SSMB or SMB chromatography. In some alternatives, the method further includes isolating, evaporating, purifying or concentrating the xylose from the refined sugar stream that comprises xylose. In some alternatives, the xylose obtained by these procedures has a purity of 75%-96%, such as 80%-96%.

An extraction mixture is also an aspect of the invention. The extraction mixture includes a biomass hydrolysis solution that comprises a population of mixed sugars comprising xylose, an acid, and impurities; and a thermally-phase separable solvent, e.g., an ethylene glycol or a propylene glycol ether, such as 2-butoxyethanol (EB), or 1-propoxy-2-propanol (PP), or any combination thereof. In some alternatives, the extraction mixture also includes an alkanol, such as hexanol or 2-ethylhexanol, with or without an amine extractant, such as trilauryl amine (TLA) in hexanol.

DETAILED DESCRIPTION OF THE PREFERRED EMBODIMENT

Figure 1:
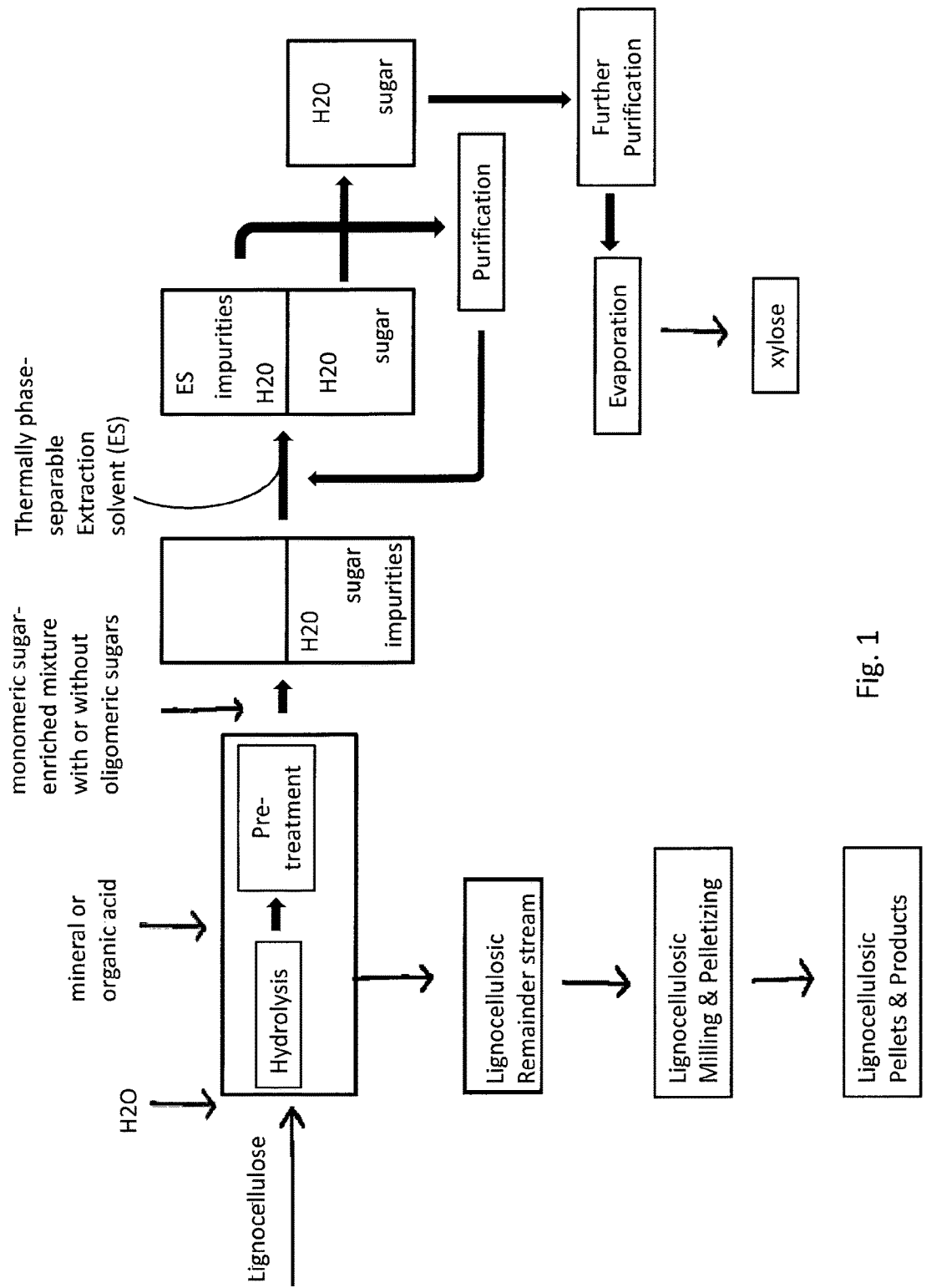
FIG. 1 illustrates a scheme for the isolation or purification of a sugar stream enriched in monomeric sugars, preferably xylose.

Aspects of the present invention relate to lignocellulosic biomass processing and refining to produce hemicellulose sugars, cellulose sugars, monomeric sugars, preferably xylose, lignin, cellulose and other high-value products. In some alternatives, methods of generating a refined monomeric sugar stream that includes xylose from a biomass hydrolysis solution are disclosed. These methods include contacting a biomass hydrolysis solution that comprises a population of oligomeric sugars and monomeric sugars, preferably xylose, an acid, and impurities, with a thermally phase-separable extractant, e.g., an ethylene glycol or a propylene glycol ether, such as 2-butoxyethanol, or 1-propoxy-2-propanol, or any combination thereof, to form an extraction mixture; and separating from said extraction mixture a first stream that includes the chosen glycol solvent or solvents, acid and impurities and a second refined or enriched sugar stream, which comprises oligomeric and/or monomeric sugars, preferably xylose. The second refined or enriched sugar stream comprising oligomeric and/or monomeric sugars, preferably xylose, and the thermally phase-separable extractant, e.g., an ethylene glycol or a propylene glycol ether, such as 2-butoxyethanol, or 1-propoxy-2-propanol, or any combination thereof, can be further separated, enriched, isolated, and/or purified by subjecting the second stream to heat (e.g., 30° C.-100° C.), followed by isolation, enrichment, and/or purification of the oligomeric sugars and monomeric sugars, preferably xylose, by chromatography (e.g., SMB and/or SSMB chromatography), concentration, and/or evaporation.

Desirably, aspects of the invention described herein allow for the isolation of a sugar stream that is enriched in monomeric and/or oligomeric sugars, such as a xylose enriched sugar stream, after a single extraction of a biomass hydrolysis solution, e.g., with a thermally phase-separable extractant, such as an ethylene glycol or a propylene glycol ether, for instance 2-butoxyethanol, or 1-propoxy-2-propanol, or any combination thereof. After the biomass hydrolysis solution is contacted with the thermally phase-separable extractant, the addition of heat, such as 30° C.-100° C., allows for isolation of a sugar stream that is enriched in monomeric and/or oligomeric sugars, such as a xylose enriched sugar stream, and such sugar enrichment or isolation can be accomplished in the absence of chromatographic procedures, which are conventionally required to enrich a sugar stream for monomeric and/or oligomeric sugars, such as a xylose. It has been surprisingly discovered that a class of solvents that has not been previously recognized for sugar extraction, quite efficiently separates monomeric and/or oligomeric sugars, such as a xylose, from the acid used in the hydrolytic processing of lignocellulosic biomass, as well as, impurities generated in the process without having to employ chromatographic steps, which significantly reduces the cost of sugar enrichment and purification on an industrial scale.

The extraction mixtures described herein are also aspects of the present invention. Such extraction mixtures comprise a biomass hydrolysis solution that comprises oligomeric and/or monomeric sugars, preferably xylose, an acid, impurities, and a thermally phase-separable extractant, e.g., an ethylene glycol or a propylene glycol ether, such as 2-butoxyethanol, or 1-propoxy-2-propanol, or any combination thereof.

The lignocellulosic biomass processing and refining processes described herein include: (1) preconditioning of the lignocellulosic biomass followed by hydrolysis and post hydrolysis processing (e.g., chromatographic separations, such as anion exchange, e.g., weak-base anion exchange, and/or cation exchange, such as strong acid cation exchange); (2) Thermally phase-separable extraction (e.g., utilizing an ethylene glycol or a propylene glycol ether, such as 2-butoxyethanol, or 1-propoxy-2-propanol, or any combination thereof); and (3) isolation, refinement, enrichment, or purification of fractions comprising the enriched oligomeric and/or monomeric sugars, preferably xylose, by for example SMB or SSMB chromatography, preferably followed by evaporation. The section below describes in greater detail the preconditioning of the lignocellulosic biomass followed by hydrolysis and post hydrolysis processing.

Preconditioning of the Lignocellulosic Biomass, Hydrolysis and Post Hydrolysis Processing A lignocellulosic biomass, such as bagasse, is a desirable starting material for sugar purification. Lignocellulosic biomass processing and refining begins with a conditioning of the lignocellulosic biomass, whereby the biomass is debarked, chipped, shred, dried, and/or ground to particles so as to generate a conditioned lignocellulose preparation. The conditioned lignocellulosic biomass is then hydrolyzed with an organic and/or mineral acid, preferably in low concentrations, heat, and optionally, under pressure, so as to obtain an acidic hemicellulose sugar stream and a lignocellulosic remainder stream. The lignocellulosic remainder contains mostly cellulose and lignin. In some methods, the lignocellulosic remainder is further processed to make bioenergy pellets, which can be burned as fuels. In some methods, the lignocellulosic remainder can be directly processed to extract lignin and/or can be further hydrolyzed and processed using the methods described herein, for example, to generate improved yields of oligomeric and monomeric sugars, such as xylose. This process produces a high purity lignin and high purity cellulose. The lignin purification process contemplated herein may utilize a limited solubility solvent, preferably an alkanol, such as methyl ethyl ketone (MEK), and can produce a lignin having purity greater than 99%.

Prior to hydrolysis of the lignocellulose and hemicellulose sugar extraction, the lignocellulosic biomass is preferably preconditioned so as to enhance hydrolysis. Preconditioning in this context refers to the reduction in biomass size and structure (e.g., mechanical breakdown with or without evaporation), which does not substantially affect the lignin, cellulose and hemicellulose compositions of the biomass. Preconditioning in this manner facilitates more efficient and economical processing of a downstream process (e.g., hydrolysis and hemicellulose sugar extraction). Preferably, lignocellulosic biomass is debarked, chipped, shredded and/or dried to obtain preconditioned lignocellulosic biomass (also referred to as a conditioned lignocelluolose preparation). Preconditioning of the lignocellulosic biomass can also utilize, for example, ultrasonic energy or hydrothermal treatments including water, heat, steam or pressurized steam. Preconditioning can occur or be deployed in various types of containers, reactors, pipes, flow through cells and the like. In some methods, it is preferred to have the lignocellulosic biomass preconditioned before hydrolysis and hemicellulose sugar extraction and isolation of oligomeric and monomeric sugars. In some methods, depending on the biomass starting materials, no preconditioning is required e.g., lignocellulosic biomass, such as streams comprising liberated oligomeric sugars and/or hemicellulose, can be directly taken into a hydrolysis step.

Optionally, lignocellulosic biomass can be milled or ground to reduce particle size. In some embodiments, the lignocellulosic biomass is ground such that the average size of the particles is in the range of 100-10,000 micron, preferably 400-5,000, e.g., 100-400, 400-1,000, 1,000-3,000, 3,000-5,000, or 5,000-10,000 microns or to a size within a range defined by any two of the aforementioned sizes. In some embodiments, the lignocellulosic biomass is ground such that the average size of the particles is less than 10,000, 9,000, 8,000, 7,000, 6,000, 5,000, 4,000, 3,000, 1,000, or 400 microns or within a range defined by any two of the aforementioned sizes. Compared to ungrounded particles, such as chips, ground particles can be suspended in the hydrolysis liquid, and can be circulated from container to container easily. Ground particles from different lignocellulosic biomass materials can be processed by the same set of equipment using similar or same operating parameters. Reduced particle size can greatly accelerate the cellulose hydrolysis process.

Any hydrolysis method and/or system can be used for cellulose hydrolysis, including enzymatic means and/or chemical methods. For example, any one or more procedures disclosed in WO2012061085 (herein expressly incorporated by reference, in its entirety) can be utilized. In one alternative, hydrolysis and the liberation of the cellulose sugars are performed using a stirred tank hydrolysis system. This counter current system is desired for acid hydrolysis of cellulose sugars. When multiple tanks are used, the system enables separate temperature control for each individual tank. The system can be adapted for various lignocellulosic biomass materials. After preconditioning of the lignocellulosic biomass so as to obtain a conditioned lignocellulosic preparation, the conditioned lignocellulosic preparation is subjected to acid hydrolysis, e.g., HCl or $H_2SO_4$ so as to generate a biomass hydrolysis mixture (e.g., an acidic hemicellulose sugar stream) and a lignocellulosic remainder stream. In some alternatives, the method utilizes autohydrolysis, wherein a conditioned lignocellulose preparation or a mixed sugar preparation undergoes hydrolysis without the addition of an exogenous acid (e.g., the conditioned lignocellulose preparation or mixed sugar preparation is hydrolyzed by the acid already present in the preparation and an additional organic and/or inorganic acid, an exogenously added acid, is not provided). By some approaches, the acid required for hydrolysis is present in conditioned lignocellulosic preparation and an additional acid is not added to the conditioned lignocellulosic preparation. In some embodiments, acid hydrolysis is performed under pressure and/or heat, such as by pressure cooking. After hydrolysis, the lignocellulosic remainder stream can be separated from the acidic hemicellulose sugar steam by several approaches, including, filtration, centrifugation or sedimentation to form a liquid stream and a solid stream. The acidic hemicellulose sugar stream contains hemicellulose sugars and impurities. The lignocellulosic remainder stream contains predominantly cellulose and lignin. The lignocellulosic remainder stream can be subjected to further rounds of preconditioning (e.g., grinding) and/or hydrolysis.

The lignocellulosic remainder stream can also be washed to recover additional hemicellulose sugars and acidic catalyst trapped inside the biomass pores. Once recovered, this solution can be recycled back to the acidic hemicellulose sugar stream, or recycled back to receive further hydrolysis. The lignocellulosic remainder stream can be pressed mechanically to increase solid contents (e.g., dry solid contents 40-60%). Filtrate from the pressing step can be recycled back to the acidic hemicellulose sugar stream, or recycled back to receive further acidic hydrolysis, as well. Optionally, the remaining lignocellulosic remainder is ground to reduce particle sizes. Optionally, the pressed lignocellulosic remainder is dried to lower the moisture content, e.g., less than 15%. The dried matter can be further hydrolysed to extract lignin and cellulose sugars, as set forth above. Alternatively, the dried matter can be pelletized into pellets, which can be burned as energy source for heat and electricity production or can be used as feedstock for conversion to bio oil.

Preferably, an aqueous acidic solution is used to hydrolyze the lignocellulose biomass. The aqueous acidic solution can contain any acids, inorganic or organic. Preferably, an inorganic acid is used. For example, the solution can be an acidic aqueous solution containing an inorganic or organic acid, such as $H_2SO_4$, $H_2SO_3$ (which can be introduced as dissolved acid or as $SO_2$ gas), HCl, and/or acetic acid. The acidic aqueous solution can contain an acid in an amount of 0 to 2% acid or more, e.g., 0-0.2%, 0.2-0.4%, 0.4-0.6%, 0.6-0.8%, 0.8-1.0%, 1.0-1.2%, 1.2-1.4%, 1.4-1.6%, 1.6-1.8%, 1.8-2.0% or more weight/weight or an amount within a range defined by any two of the aforementioned amounts. Preferably, the aqueous solution for the extraction includes 0.2-0.7% $H_2SO_4$ and 0-3,000 ppm $SO_2$. The pH of the acidic aqueous solution can be, for example, in the range of 1-5, preferably 1-3.5, such as a pH of 1, 2, 3, 4, or 5 or within a range defined by any two of the aforementioned pH values.

In some embodiments, an elevated temperature or pressure is used in the hydrolysis. For example, a temperature in the range of 100-200° C., or more than 50° C., 60° C., 70° C., 80° C., 90° C., 100° C., 110° C., 120° C., 130° C., 140° C., 150° C., 160° C., 170° C., 180° C., 190° C., or 200° C. can be used or a temperature within a range defined by any two of the aforementioned temperatures can be used. Preferably, the temperature is in the range of 110-160° C., or 120-150° C. The pressure can be in the range of 1-10 MPa, preferably, 1-5 MPa, such as 1, 2, 3, 4, 5, 6, 7, 8, 9, or 10 MPa or within a range defined by any two of the aforementioned pressures. The solution can be heated for 0.5-5 hours, preferably 0.5-3 hours, 0.5-1 hour, 1-2 hours, or 2-3 hours, or for a time within a range defined by any two of the aforementioned times, optionally with a cooling down period of one hour.

In some alternatives, the conditioned lignocellulosic preparation and/or the lignocellulosic remainder stream after a first round of hydrolysis is subjected to further cellulose hydrolysis to obtain an acidic hydrolysate stream and acidic lignin stream, as follows. A lignocellulosic stream (e.g., a conditioned lignocellulosic preparation or a lignocellulosic remainder stream) is adjusted to a moisture content of 5 to 85% weight/weight (e.g., by drying) and the resultant product is then milled or ground to particle size of 400-5000 micron (preferably −1400 micron) by any industrial mill including hammer mill or pin mill. If moisture content is higher than 15%, the ground lignocellulosic remainder is dried to have moisture <15%. The hydrolysis system includes a number of n stirred tanks (e.g., n=1-9, preferably 4) connected in series. The aqueous liquid in the tank, containing acid, dissolved sugar and suspended biomass is recycled by a high pressure high flow rate pump causing stirring of the solution in each tank. The flow line is also fitted with a solid/liquid separation device (e.g., a filter, a membrane, centrifuge, or a hydrocyclone) that allows at least some of the liquid and dissolved molecules, e.g., acid and sugars, to permeate thereby producing a permeate (or filtrate) stream. At least some of the feed liquid is retained by the solid/liquid separation device to produce a retentate stream.

In some alternatives, a super azeotropic HCl solution with acid concentration of at least 41% is fed into tank n. The permeate of the separation unit of tank n is fed into reactor n−1 while at least part of the retentate is recycled back into tank n. The permeate of tank n−1 is fed into tank n−2 while the retentate is recycled back into tank n−1 and so on. The permeate exiting tank 1 of the series is the acidic hydrolysate stream. The solids concentration in each stirred tank reactor can be maintained between 3-15%, 3-5%, 5-10%, or 10-15% weight/weight or within a range defined by any of the two aforementioned values. Overall, the biomass is retained in the system over 10 to 48 hours. The temperature of each reactor is controlled separately at the range 5 to 40° C.

In some alternatives, the ground, conditioned, lignocellulosic preparation or the ground lignocellulosic remainder stream is added to the first stage of a series of stirred tank reactors (e.g., 1 to 9 reactors, preferably 4 reactors). The slurry is mixed though agitation or recirculation of the liquor inside the reactors. At least some of the retentate of tank 1 is fed into tank 2; at least some of the retentate of tank 2 is fed into tank 3 and so on. Eventually the acidic lignin stream exits tank n to the lignin wash system.

In some embodiments, concentrated hydrochloric acid (>35%, 36%, 37%, 38%, 39%, 40%, 41%, or preferably 42%, or a percentage within a range defined by any two of the aforementioned percentages) is added into the last reactor in the series, and less concentrated hydrochloric acid (~25%, 26%, 27%, 28%, 29%, 30%, or preferably 31%,) exits from the first reactor in the series. In some embodiments, hydrolyzed sugars exit from the first reactor in the series.

The acidic hydrolysate stream containing the acid and cellulose sugars is transferred from the last reactor to the second to the last reactor and so on until the hydrolysate leaves the first reactor for additional purification. In an exemplary reactor system, the hydrolysate leaving the first reactor has between 8-16% sugars and hydrochloric acid. In some embodiments, the acidic hydrolysate stream can contain more than 8%, 9%, 10%, 11%, 12%, 13%, 14%, or a percentage within a range defined by any two of the aforementioned percentages in dissolved sugars. In some embodiments, the acidic hydrolysate stream can contain more than 22%, 24%, 26%, 28%, 30%, 32% 34%, 36%, or a percentage within a range defined by any two of the aforementioned percentages dissolved sugars HCl. In some embodiments, the acidic hydrolysate stream can contain less than 32%, 30%, 28%, 26%, 24%, 22%, or 20%, or a percentage within a range defined by any two of the aforementioned percentages HCl.

The temperature in all the reactors is preferably maintained in the range of 5-80° C., e.g., 15-60° C., preferably 10-40° C., or a temperature within a range defined by any two of the aforementioned temperatures. Total retention time of the biomass in all reactors can range from 1 to 5 days, e.g., 1 to 3 days, preferably 10 to 48 hours, or an amount of time within a range defined by any two of the aforementioned amounts of time.

Preferably, when multiple stirred tank reactors are used, at least a portion of the aqueous acid hydrolysate stream leaving an intermediate reactor (e.g., reactor 2 or 3) is mixed with the conditioned, lignocellulosic preparation or the ground lignocellulosic remainder stream before the stream is introduced into the first reactor. The stream can be pre-hydrolyzed by the aqueous acid hydrolysate stream from the intermediate reactor before it is contacted with the strong acid in the first reactor. Preferably, the pre-hydrolysis mixture is heated to a temperature in the range of 15 to 60° C., preferably 25 to 40° C., most preferably 40° C., or a temperature within a range defined by any two of the aforementioned temperatures for 5 minutes to 1 day, preferably 15-20 minutes, or an amount of time within a range defined by any two of the aforementioned amounts of time.

In some embodiments, hydrolysis of oligomeric sugars in the mixed sugar stream is conducted at a temperature greater than 60° C., optionally between 70° C. and 130° C., optionally between 80° C. and 120° C. and optionally between 90° C. and 110° C., or at a temperature within a range defined by any two of the aforementioned temperature. In some embodiments, hydrolysis proceeds at least 10 minutes, optionally between 20 minutes and 6 hours, optionally between 30 minutes and 4 hours and optionally between 45 minutes and 3 hours, or for an amount of time within a range defined by any two of the aforementioned amount of time.

A system may be used that includes a secondary hydrolysis unit adapted to receive an input stream, which includes a sugar mixture in a super azeotropic HCl aqueous solution. The secondary hydrolysis unit can also be adapted to increase the ratio of monomeric sugars to oligomeric sugars in an output stream. In some embodiments, secondary hydrolysis under the aforementioned conditions increases the yield of monomeric sugars with little or no degradation of sugars. In some embodiments, monomers as a fraction of total sugars is greater than 70%, optionally greater than 80%, optionally greater than 85% and optionally greater than 90%, or a percentage within a range defined by any two of the aforementioned percentages by weight after hydrolysis. In some embodiments, degradation of monomeric sugars during the hydrolysis is less than 1%, optionally less than 0.2%, optionally less than 0.1% and optionally less than 0.05%, or a percentage within a range defined by any two of the aforementioned percentages by weight.

In some embodiments, this secondary hydrolysis continues for at least 1, at least 2 or at least 3 hours or an amount of time within a range defined by any two of the aforementioned amounts of time. Optionally, this secondary hydrolysis lasts 1 to 3 hours, optionally about 2 hours. In some embodiments, the temperature is maintained below 150, 140, 130, 120, 110, 100 or below 90° C. or a temperature within a range defined by any two of the aforementioned temperatures. In some embodiments, the temperature is maintained between 60° C. to 150° C., between 70° C. to 140° C. or between 80° C. to 130° C., or a temperature within a range defined by any two of the aforementioned temperatures. In some embodiments, the secondary hydrolysis results in a monomeric sugar proportion of 80 to 90%, optionally 85 to 88%, optionally about 86% of the total sugars, or a percentage within a range defined by any two of the aforementioned percentages. In some embodiments, the secondary hydrolysis results in a monomeric sugar proportion of at least 72%, 74%, 76%, 78%, 80%, 82%, 84%, 86%, 88% or even at least 90% weight/weight of the total sugars, or a percentage within a range defined by any two of the aforementioned percentages. In some embodiments, the resultant secondary hydrolysate contains at least 20%, 22, 24%, 26%, 28%, 30%, 32%, 34%, 36%, 38%, 40%, 42%, 44%, 46%, 48% or 50%, or a percentage within a range defined by any two of the aforementioned percentages weight/weight total sugars.

In some embodiments, the hydrolysis reactor(s) operate at 95, 100, 105, 110, 115, 120 or 125° C. or a temperature within a range defined by any two of the aforementioned temperatures. In some embodiments, the hydrolysis reactor(s) operate at a pressure of 1.8, 1.9, 2.0, 2.1 or 2.2 bar, or a pressure within a range defined by any two of the aforementioned pressures. In some embodiments, the hydrolysis reaction continues for 1 to 3 hours, 1.5 to 2.5 hours or 1.7 to 2 hours, or an amount of time within a range defined by any two of the aforementioned amounts of time. In some embodiments, the hydrolysis reaction is conducted at 95° C. for about 2 hours at atmospheric pressure. In other exemplary embodiments, the hydrolysis reaction is conducted at 125° C. for about 1.7 hours at about 2 bar.

In one example, conditioned eucalyptus is hydrolyzed using stirred tank reactors. Upon initial introduction of the conditioned eucalyptus wood into the acid, viscosity initially increases as a result of fast dissolution of oligomers of cellulosic sugars, the high viscosity hinders the ability to pump and recirculate the aqueous solution through the system; the short stirring of ground, conditioned, lignocellulosic preparation or the ground lignocellulosic remainder stream with intermediate reactor hydrolysate at elevated temperature accelerates further hydrolysis of the dissolved oligomers to monomer, accompanied with decrease in viscosity. In another example, conditioned eucalyptus is first contacted with acid solution coming out of stage 2 (e.g., at a concentration ~33%) at 35-50° C. for 15-20 minutes. The pre-hydrolyzed conditioned eucalyptus can be fed into the system much faster and is further hydrolyzed in the stirred tank reactors. Stirred tank reactors can be used similarly for various sources of biomass including hardwood, softwood, and bagasse. After the cellulose hydrolysis, the remaining residues in the lignocellulosic biomass form an acidic lignin stream. The acidic hydrolysate stream produced by cellulose hydrolysis can be further refined, as described below.

The acidic hemicellulose sugar stream may be further refined prior to sugar extraction and purification utilizing chromatographic and/or evaporation procedures. The acidic hemicellulose sugar stream is preferably neutralized or the acid is removed from the hemicellulose sugar stream and/or the hemicellulose sugar stream is separated, refined, or enriched by contacting it with an ion exchange resin, e.g., ion exchange chromatography, preferably by contact with or chromatography over a strong acid cation exchange resin and, optionally followed by contact with or chromatography over a weak base anion exchange resin, e.g., chromatography over such a resin. The neutralized hemicellulose sugar stream can be, optionally evaporated to form a more concentrated hemicellulose sugar mixture. Optionally, the hemicellulose sugar stream is further refined by contact with granulated activated carbon prior to or after evaporation.

In some alternatives, the acid-depleted hemicellulose sugar stream can be refined using a packed distillation column. The distillation process can remove at least 70%, 80%, 90%, or 95%, or an amount within a range defined by any two of the aforementioned values, of the diluent in the acid-depleted hemicellulose sugar stream. With or without diluent distillation, the acid-depleted hemicellulose sugar stream can be contacted with a strong acid cation (SAC) exchange resin, such as by chromatography, so as to remove any residual metallic cations. Preferably, the acid-depleted hemicellulose sugar stream is purified using a packed distillation column followed by a strong acid cation exchange (SAC) chromatography. In some aspects, the hemicellulose sugar stream is contacted with a weak base anion (WBA) exchange resin, such as by chromatography, so as to remove excess protons. The neutralized hemicellulose sugar stream can be pH adjusted and evaporated to 25-65% and preferably 30-40% weight/weight dissolved sugars in any conventional evaporator, e.g., a multiple effect evaporator or a mechanical vapor recompression (MVR) evaporator.

In some alternatives, the acid-depleted hemicellulose sugar stream is contacted with a strong acid cation (SAC) exchange resin, such as by chromatography, so as to remove any residual metallic cations, preferably followed by contact with a weak base anion (WBA) exchange resin, such as by chromatography, so as to remove excess protons. The neutralized hydrolysate can be pH adjusted and evaporated to 25-65% and preferably 30-40% weight/weight dissolved sugars in any conventional evaporator, e.g., a multiple effect evaporator or a Mechanical Vapor Recompression (MVR) evaporator. Optionally the concentrated sugar solution can be contacted with activated carbon to remove residual organic impurities. The concentrated sugar solution may also be contacted with mixed bed resin system so as to remove any residual ions or color bodies. The acid-depleted hemicellulose sugar stream and/or the concentrated sugar solution can then be extracted with a thermally phase-separable extractant and further enriched for oligomeric sugars and monomeric sugars, preferably xylose, utilizing the approaches described in the section below.

Thermally Phase-Separable Extraction

Figure 2:
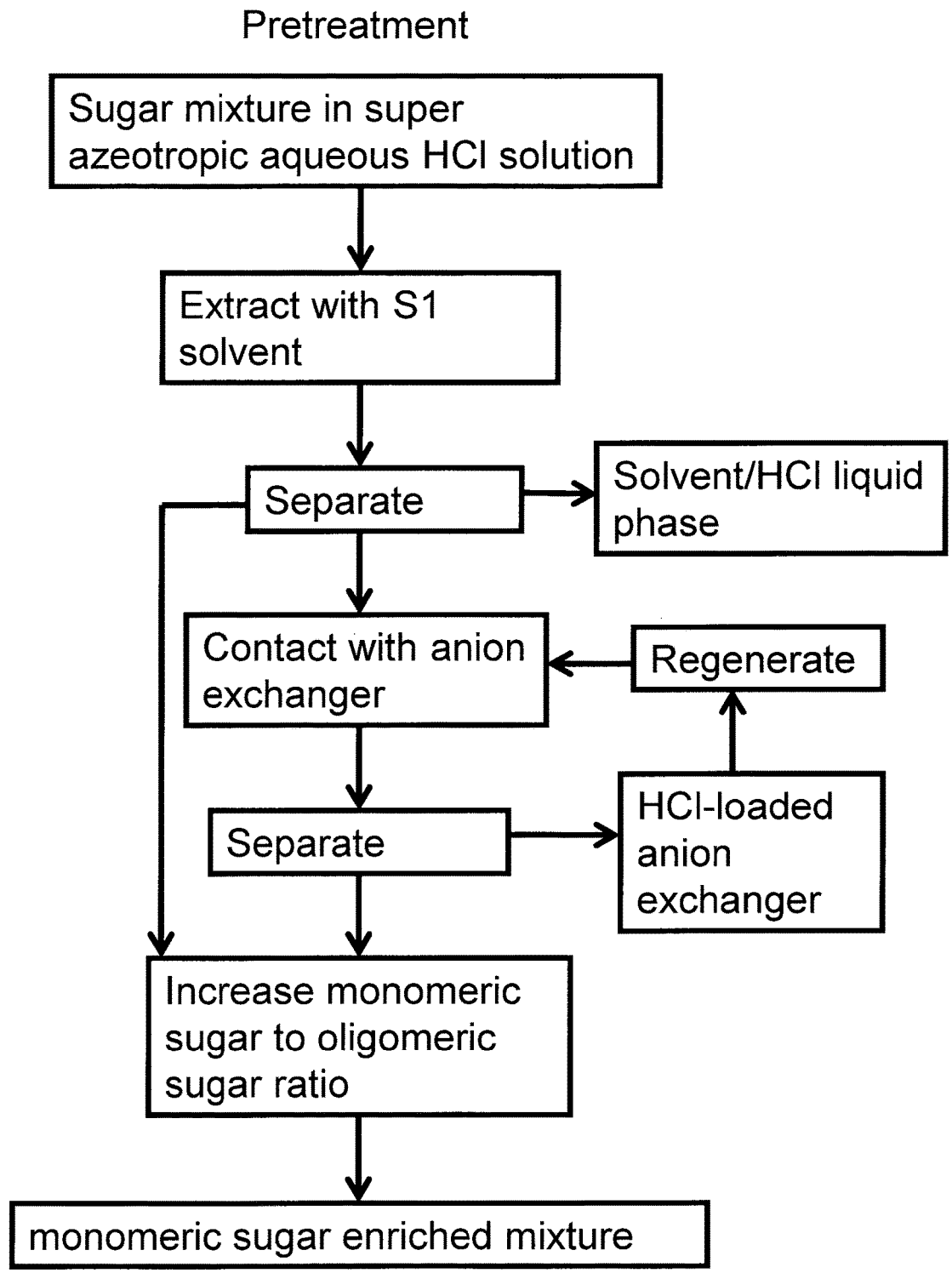
FIG. 2 illustrates a biomass hydrolysis solution pretreatment approach yielding a monomeric sugar enriched mixture, preferably comprising xylose.
Figure 3:
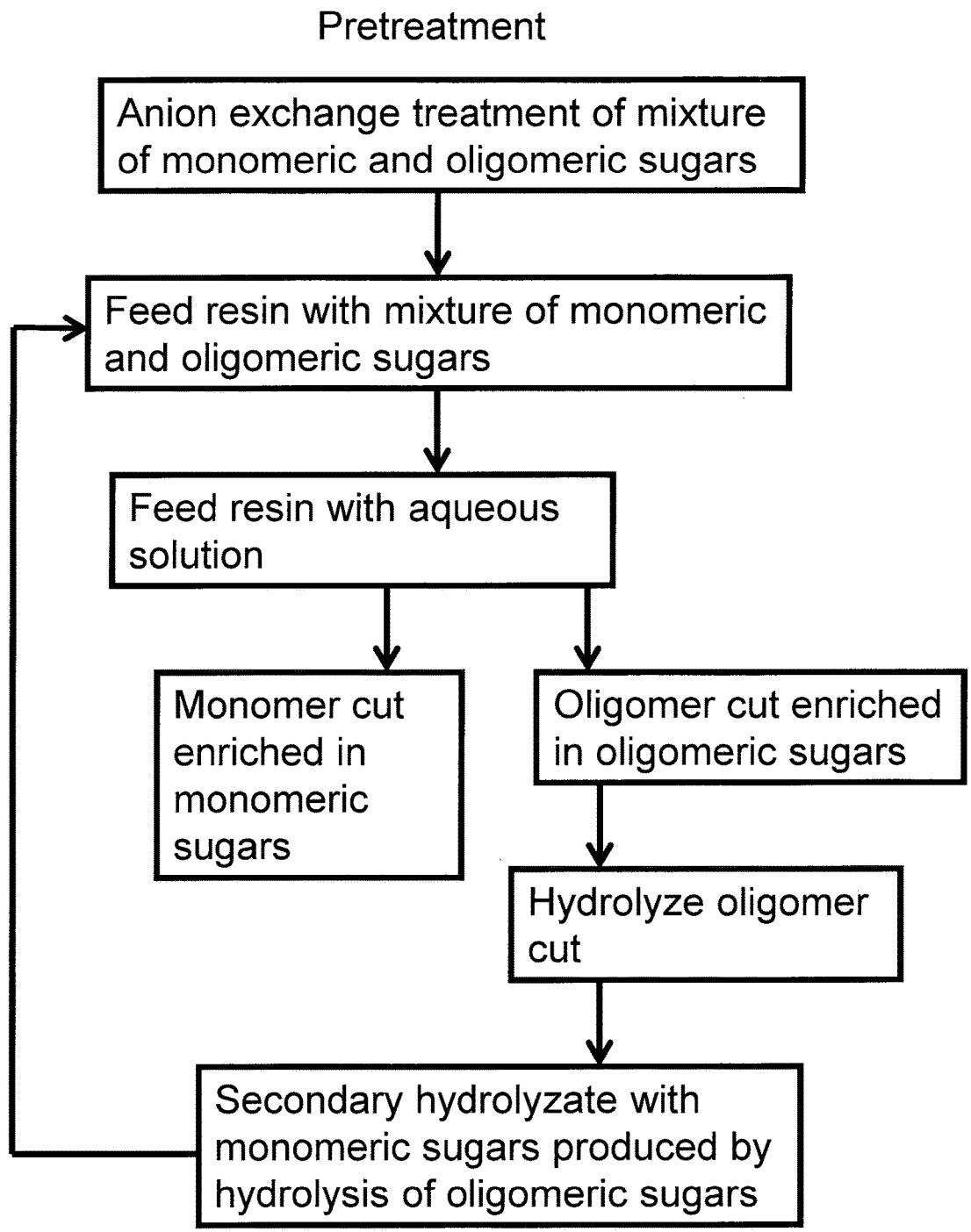
FIG. 3 illustrates a biomass hydrolysis solution pretreatment approach yielding an oligomeric sugar fraction and a monomeric sugar enriched mixture, preferably comprising xylose, wherein the oligomeric sugar fraction is subjected to further acid hydrolysis, and recycled through an anion exchange separation to yield additional monomeric sugar enriched mixtures, which preferably comprise xylose.
Figure 4:
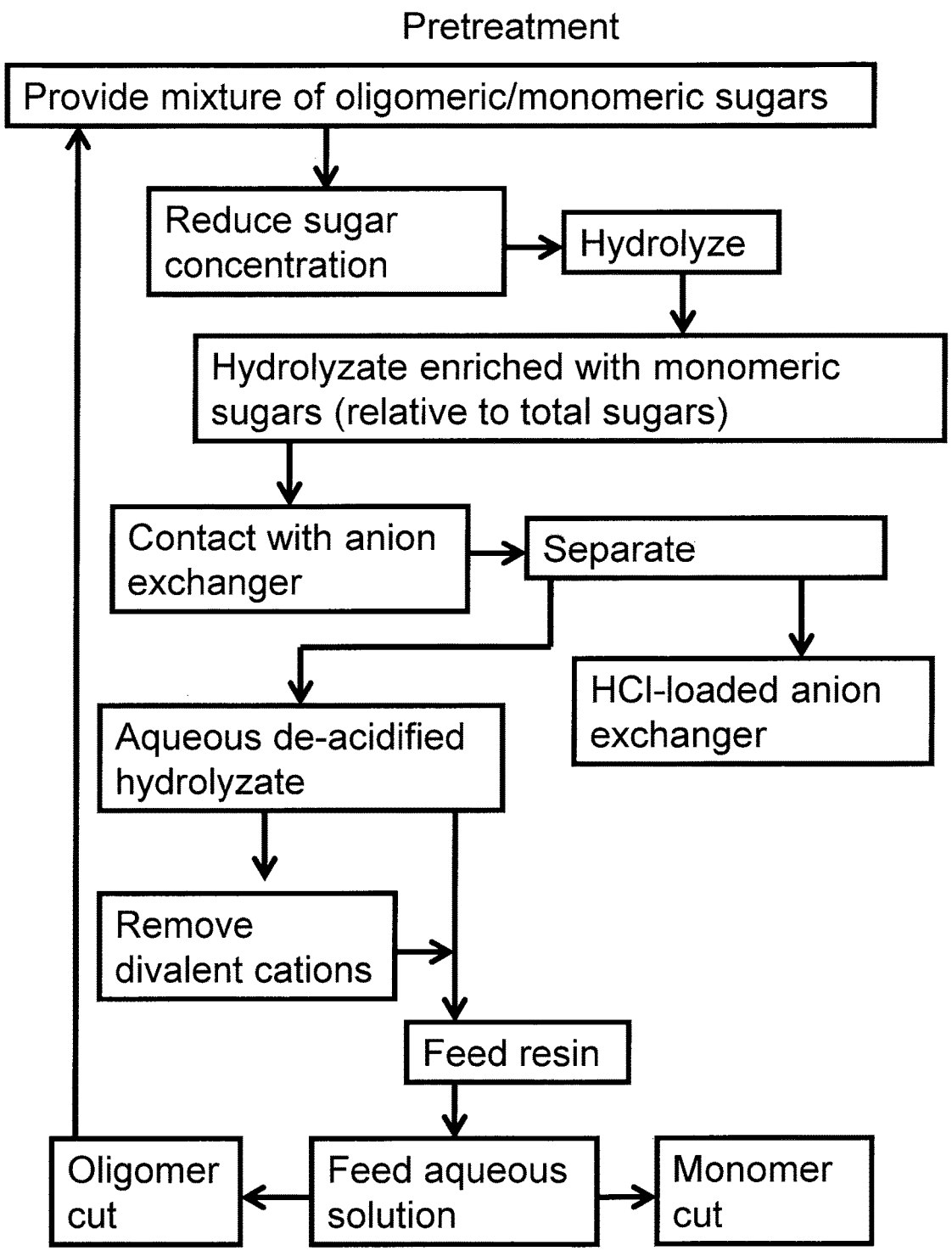
FIG. 4 illustrates a biomass hydrolysis solution pretreatment approach yielding an oligomeric sugar fraction and a monomeric sugar enriched mixture, preferably comprising xylose, wherein the oligomeric sugar fraction is subjected to further acid hydrolysis, and recycled through an anion exchange separation to yield additional monomeric sugar enriched mixtures, which preferably comprise xylose.

With reference to FIGS. 1-4, in some alternatives, the method includes one or more hydrolysis steps, wherein a conditioned lignocellulose preparation or a mixed sugar preparation is hydrolyzed with a mineral and/or organic acid, such as HCl or $H_2SO_4$ (also referred to as, a biomass hydrolysis solution), followed by one or more post hydrolysis steps, wherein the sugar mixture generated by hydrolysis of the lignocellulose preparation or mixed sugar preparation is extracted with a solvent, and/or a solvent and a thermally phase-separable solvent mixture, such as an alkanol (e.g., hexanol) and the solvent treated mixed sugar stream is separated by chromatography (e.g., anion exchange, such as weak-base anion exchange, and/or cation exchange, such as strong acid cation exchange) so as to remove impurities and increase the monomeric sugar to oligomeric sugar ratio and (see FIGS. 2-4). In some alternatives, the method includes autohydrolysis, wherein a conditioned lignocellulose preparation or a mixed sugar preparation undergoes hydrolysis without the addition of acid (e.g., the conditioned lignocellulose preparation or mixed sugar preparation is hydrolyzed by the acid already present in the preparation). This hydrolysis and post hydrolysis procedure can be repeated 1, 2, 3, 4, 5, 6, 7, 8, 9, or 10 times or more e.g., by recycling the sugar-containing stream through additional hydrolysis and post hydrolysis processing steps so as to increase the monomeric sugar to oligomeric sugar ratio, preferably encouraging the increase in xylose concentration in the sugar stream (see FIGS. 3 and 4). The lignocellulosic remainder stream can be subjected to milling and pelletizing to produce lignocellulose pellet products (see FIG. 1).

The monomeric sugar enriched mixture obtained after hydrolysis and, in some alternatives obtained after post hydrolysis processing, is then contacted with a thermally phase-separable solvent, such as an ethylene glycol or a propylene glycol ether, such as 2-butoxyethanol, 1-propoxy-2-propanol, or any combination thereof and a separation of the aqueous and organic phases is conducted so as to obtain an aqueous phase comprising an isolated or enriched oligomeric and/or monomeric sugar stream, preferably comprising an enriched amount of monomeric sugars, such as xylose, and having a reduced amount of impurities. The thermally phase-separable extractant-containing mixture in the organic phase comprising impurities and unseparated monomeric and oligomeric sugars can then be subjected to heat, such as 30° C.-100° C., so as to separate, isolate, enrich, or purify a oligomeric and/or monomeric sugar stream, preferably comprising an enriched amount of monomeric sugars, such as xylose, from the thermally phase-separable extractant and impurities. The sugar stream, preferably comprising an enriched amount of monomeric sugars, such as xylose obtained after heat treatment can also be recycled in subsequent rounds of the extraction and enrichment procedures described above e.g., with additional mixed sugar streams having oligomeric and monomeric sugars, as shown in FIG. 1. The isolated sugar streams that are enriched for oligomeric and monomeric sugars, preferably xylose, can also be subjected to further purification or enrichment, such as by chromatography, e.g., SMB and/or SSMB, and/or evaporation so as to yield a greater purity monomeric sugar fraction, preferably comprising xylose. These enrichment and/or purification steps can be repeated 1, 2, 3, 4, 5, 6, 7, 8, 9, or 10 times or more so as to continually enrich a sugar stream for monomeric sugars, preferably comprising xylose.

Figure 5:
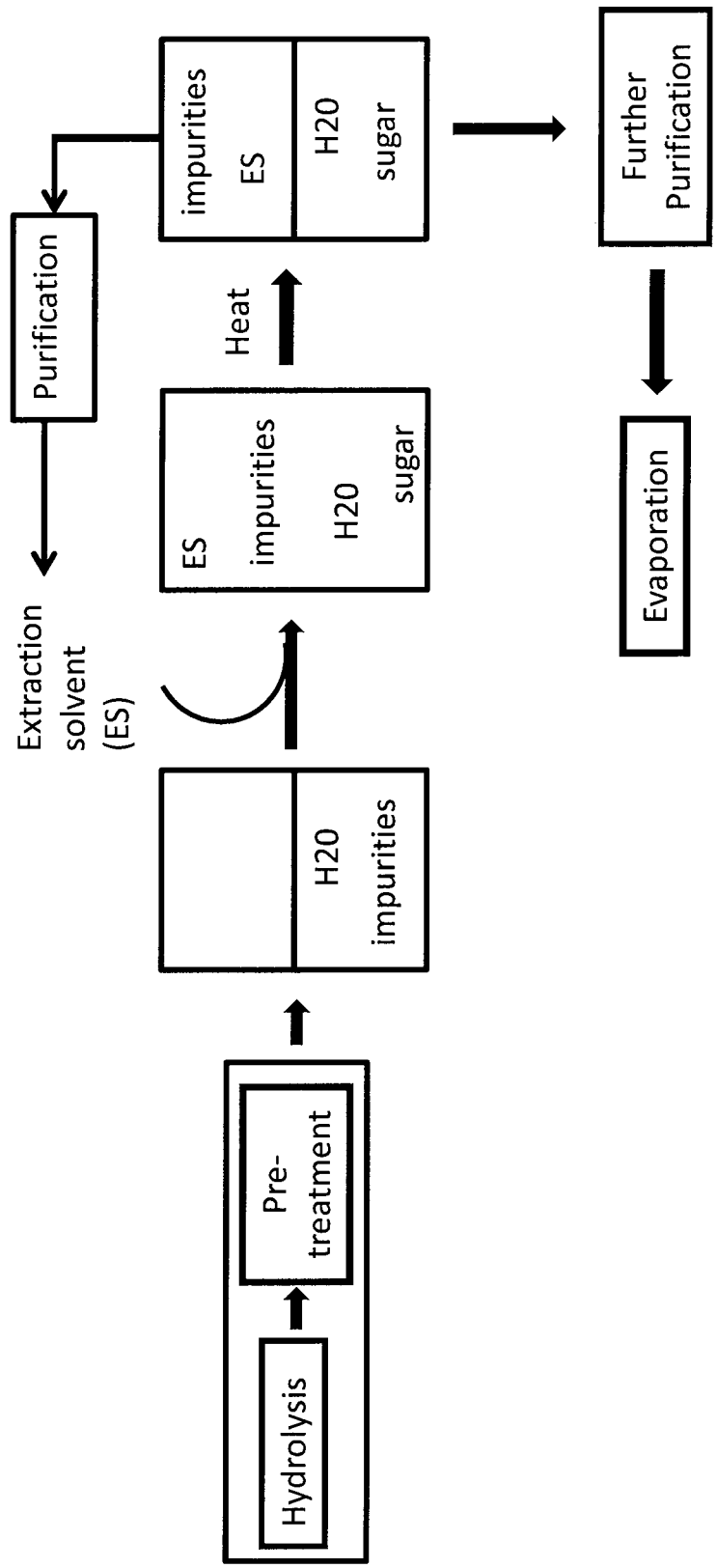
FIG. 5 illustrates a scheme of an extraction process, wherein monomeric sugars, preferably comprising xylose, are enriched by extraction and separation into an organic phase comprising a thermally phase-separable extraction solvent, preferably 2-butoxyethanol (EB) or 1-propoxy-2-propanol (PP) and monomeric sugars, preferably comprising xylose, are enriched, separated or isolated from the organic phase by the addition of heat (30° C.-100° C.). Subsequent enrichment, isolation, purification, and/or crystallization of a desired monomeric sugar, preferably xylose, can be accomplished by evaporation yielding e.g., xylose at a purity of 75%-96%, such as 80%-96%.

With reference to FIG. 5, in one alternative, a stream from a biomass hydrolysis solution, which includes a population of oligomeric and/or monomeric sugars, preferably comprising xylose, is separated over a weak base anion exchange resin, preferably after said stream is separated over a strong acid cation exchange resin. After these pretreatment chromatographic steps, the biomass hydrolysis solution, which includes a population of oligomeric and/or monomeric sugars, preferably comprising xylose, an acid, and impurities, is contacted with a thermally phase-separable extractant, such as an ethylene glycol or a propylene glycol ether, such as 2-butoxyethanol, 1-propoxy-2-propanol, or any combination thereof, so as to form an extraction mixture. After extraction with the thermally phase-separable extractant and phase separation, a first aqueous fraction comprising monomeric and oligomeric sugars and water is isolated and this first aqueous fraction can be recycled for subsequent rounds of thermally phase-separable extractions, as shown in FIG. 5, so as to improve the yield of monomeric sugars, preferably xylose, from the biomass hydrolysis solution.

A second organic fraction comprising the thermally phase-separable extractant, impurities, and oligomeric and/or monomeric sugars, preferably xylose, can be isolated and subjected to further enrichment and/or purification steps, as shown in FIG. 5. In one alternative, the second organic fraction comprising the thermally phase-separable extractant, impurities, and oligomeric and/or monomeric sugars, preferably xylose, is heated to a temperature of 30° C.-100° C., such as 30° C., 35° C., 40° C., 45° C., 50° C., 55° C., 60° C., 65° C., 70° C., 75° C., 80° C., 85° C., 90° C., 95° C., or 100° C. or a temperature within a range defined by any two of the aforementioned temperatures. After heat treatment of the second organic fraction comprising the thermally phase-separable extractant, impurities, and oligomeric and/or monomeric sugars, preferably xylose, the thermally phase-separable extractant and impurities are separated from the oligomeric and/or monomeric sugar stream. The oligomeric and/or monomeric sugar stream, preferably comprising xylose, can then be subjected to further separation, enrichment, isolation and/or purification by chromatography, such as SMB and/or SSMB, and/or evaporation so as to isolate, enrich, or purify oligomeric and/or monomeric sugars, preferably comprising xylose. In some alternative approaches, the second organic fraction comprising the thermally phase-separable extractant, impurities, and any residual sugars is recycled through subsequent rounds of extractions and heat treatments, as described above and shown in FIG. 5. In some alternatives, the oligomeric and/or monomeric sugar stream, preferably comprising xylose, which is isolated after the heat treatment, is subjected to further hydrolysis, pretreatment chromatographic steps, thermally phase-separable extraction, heat separation, enrichment, or isolation of the monomeric sugar-containing stream and further chromatography, such as SMB and/or SSMB, and/or evaporation. This further enrichment and/or purification procedure can be repeated 1, 2, 3, 4, 5, 6, 7, 8, 9, or 10 times or more so as to continually enrich a sugar stream for monomeric sugars, preferably comprising xylose. In one alternative, the xylose recovered has a purity of 75%-96%, such as 80%-96%.

Refinement, Isolation, and Further Purification of Sugars

After extraction with the thermally phase-separable extractant (e.g., an ethylene glycol or a propylene glycol ether, such as 2-butoxyethanol, 1-propoxy-2-propanol, or any combination thereof) and separation, isolation, or enrichment of the oligomeric and/or monomeric sugar stream, preferably comprising xylose, from the thermally phase-separable extractant and impurities (e.g., by utilization of heat at 30° C.-100° C.), the oligomeric and/or monomeric sugar stream, preferably comprising xylose can be further refined, isolated, or purified by contacting the resultant oligomeric and/or monomeric sugar stream, preferably comprising xylose with an ion exchange resin, such as by chromatography over the resin. In some alternatives, the oligomeric and/or monomeric sugar stream, preferably comprising xylose, is contacted with a strong acid cation (SAC) exchange resin, preferably by chromatographic separation. In some alternatives, the oligomeric and/or monomeric sugar stream, preferably comprising xylose, isolated after separation over the SAC resin is contacted with a weak base anion (WBA) exchange resin, preferably by chromatographic separation. In some alternatives, the oligomeric and/or monomeric sugar stream, preferably comprising xylose, isolated after separation over the WBA resin, is evaporated to 25-65%, such as 25%, 30%, 35%, 40%, 45%, 50%, 55%, 60%, or 65% or within a range defined by any two of these percentages and preferably 30-40%, weight/weight dissolved sugars in a conventional evaporator, e.g., a multiple effect evaporator or a Mechanical Vapor Recompression (MVR) evaporator. In some alternatives, the concentrated sugar solution isolated after evaporation is further refined by contact with a mixed bed resin, preferably by chromatographic separation. In some alternatives, after isolation from the mixed bed resin, the concentrated solution containing oligomeric and/or monomeric sugars is further fractionated (e.g., by chromatographic separation) to produce an enriched monomeric sugar stream, such as a xylose-enriched stream having more than 75, 78, 80, 82, 84, 85, 86, 88, 90% xylose or an amount within a range defined by any two of the aforementioned amounts, and a hemicellulose sugar remainder fraction having the monomeric sugar (e.g., xylose) removed. Fractionation can be carried out utilizing various methods including but not limited to, Simulated Moving Bed (SMB) or Sequential Simulated Moving Bed (SSMB) chromatography. Examples of such SMB and SSMB processes are disclosed, for instance, in U.S. Pat. Nos. 6,379,554, 5,102,553, 6,093,326, 6,187,204, 4,332, 623, 4,379,751 and 4,970,002, as well as, GB 2240 053, the contents of each are hereby expressly incorporated by reference in their entireties.

In an exemplary SMB or SSMB system, a resin bed is divided into a series of discrete vessels, each of which sequence through a series of 4 zones (feed, separation, feed/separation/raffinate and safety) and connected by a recirculation loop. A manifold system connects the vessels and directs, in appropriate sequence to (or from) each vessel, each of the four media accommodated by the process. Those media are generally referred to as feed, eluent, extract and raffinate. For example, a feed can be hemicellulose sugar mixture, the eluent can be water, the extract is an enriched solution of xylose and the raffinate is an aqueous solution containing high molecular weight sugars and other monomeric sugars e.g., arabinose, galactose and glucose. Optionally, the eluent can be an aqueous solution comprising low concentration of hydroxide ion to maintain the resin in hydroxyl form, or the eluent can be an aqueous solution comprising low concentration of acid to maintain the resin in a protonated form. For example, a feed comprising 30% sugar mix where xylose is about 65-70% of the mix can be fractionated using a SSMB to obtain an extract comprising about 16-20% sugars where xylose is about 82% or more and a raffinate comprising 5-7% sugar mix with only 15-18% xylose. In some alternatives, after SMB or SSMB chromatography, the refined sugar stream comprising predominantly monomeric sugars, e.g., xylose at 75%, 80%, 85%, 90%, or 95% purity or within a range defined by any two of the aforementioned percentages, is then concentrated or evaporated e.g., utilizing a multiple effect evaporator or a Mechanical Vapor Recompression (MVR) evaporator. In some alternatives, oligomeric sugars separated from monomeric sugars by e.g., SSMB chromatography are recycled in the process for further hydrolysis.

The chromatographic fractionations that can be used in the processes described herein (e.g., SMB and/or SSMB, as well as pre-SMB and/or SSMB chromatographic separations) so as to achieve refinement, isolation, or enrichment of a monomeric sugar (e.g., xylose) from a mixed oligomeric and monomeric sugar solution can be carried out with ion exchange resins (e.g., a cation exchange resin and an anion exchange resin) as the column filling material. The cation exchange resins usable in these processes include strong acid cation exchange resins and weak acid cation exchange resins. The strong acid cation exchange resins can be in a monovalent or multivalent metal cation form, e.g., in $H^+$, $Mg^{2+}$, $Ca^{2+}$ or $Zn^{2+}$ form. Preferably, the resins are in $Na^+$ form. The strong acid cation exchange resins typically have a styrene skeleton, which is preferably cross-linked with 3 to 8%, preferably 5 to 6.5% of divinylbenzene. The weak acid cation exchange resins may be in a monovalent or multivalent metal cation form, e.g., $H^+$, $Mg^{2+}$ or $Ca^{2+}$ form, preferably in $Na^+$ form.

The temperature of the chromatographic fractionations is typically in the range of 20 to 90° C., such as 20° C., 30° C., 40° C., 50° C., 60° C., 70° C., 80° C., or 90° C., preferably 40° C. to 65° C., or a temperature within a range defined by any of the aforementioned temperatures. The pH of the solution to be fractionated can be acidic or adjusted to a range of 2.5-7, preferably 3.5-6.5 and most preferably 4-5.5, or a pH within a range defined by any of the aforementioned pH values. Typically, the fractionation can be carried out with a linear flow rate of about 1 m/h-10 m/h in the separation column.

Fractionation of a monomeric sugar, such as xylose from the refined mixed sugar solution can be preferably achieved using a strong base anion (SBA) exchanger having a particle size of 280-320 µm. This larger particle size is advantageous over much smaller particles sizes used in U.S. Pat. No. 6,451,123 (herein expressly incorporated by reference for all purposes). A larger particle size reduces the back pressure of the column to industrially practical range. Suitable commercial SBA resins can be purchased from Finex (AS 510 GC Type I, Strong Base Anion, gel form), similar grades can be purchased from other manufacturers including Lanxess AG, Purolite, Dow Chemicals Ltd. or Rohm & Haas. The SBA resin may be in the sulfate or chloride form, preferably in the sulfate form. The SBA is partially impregnated with hydroxyl groups by low concentration NaOH, the range of base to sulfate is 3-12% to 97-88% respectively. To maintain this level of OH groups on the resin, a low level of NaOH, sufficient to replace the hydroxyl removed by sugar adsorption, may be included in the desorption pulse, thus making the xylose retain longer than other sugars on this resin. Fractionation may be conducted in the SSMB mode at about 40° C.-50° C., resulting in a xylose rich stream, containing at least 79%, at least 80%, at least 83%, preferably at least 85% xylose out of total sugars, and a mix sugar stream, at a recovery of at least 80%, at least 85% xylose.

In some methods, the SSMB sequence includes three steps. In the first step, a product stream is extracted by exposing and flushing the adsorbent with a desorbent stream ("desorbent to extract" step). Concurrently, a feed stream in passed into the adsorbent and a raffinate stream is flushed from the adsorbent ("feed to raffinate" step). In the second step, a raffinate stream is extracted by exposing and flushing the adsorbent with a desorbent stream ("desorbent to raffinate" step). In the third step, the desorbent is recycled back to the adsorbent ("recycle" step).

Typically, the monomeric sugar product (e.g., xylose) is extracted in such a manner that the raffinate flow equals the desorbent flow but it results in a high desorbent consumption to reach the target product recovery. Preferably, in some SSMB sequences, the product is extracted in more than one step (e.g., not only in step 1, but also in step 2). In some methods, the product stream is not only extracted in the first step, but also extracted in the second step (i.e., the "desorbent to raffinate" step). When the product is extracted in more than one step, the desorbent flow rate is equal to the sum of the extract flow rate and the raffinate flow rate. In some embodiments, the desorbent flow rate is about the same as the sum of the extract flow rate and the raffinate flow rate. In some embodiments, the desorbent flow rate is within 50-150%, 60-140%, 70-130%, 80-120%, 90-110%, 95-105%, 96-104%, 97-103%, 98-102%, 99-101%, or 99.5-100.5% or a flow rate within a range defined by any of the aforementioned flow rates, of the sum of the extract flow rate and the raffinate flow rate or at a rate within a range defined by any two of the aforementioned rates. This change in the SSMB sequence decreases the required desorbent, resulting in the target product recovery with much less desorbent volume while maintaining the SSMB chromatographic profiles in the four (4) zones and six (6) columns and purity.

Following SMB and or SSMB fractionation, the isolated monomeric and/or oligomeric sugar streams (e.g., the xylose-containing stream) can optionally be contacted with a weak acid cation (WAC) exchange resin in the $H^+$ form to neutralize the sugar stream. This acidification allows evaporation of the sugar stream while maintaining sugar stability. The WAC resin can be regenerated by a mineral acid or preferably by contacting with the waste acid stream of the SAC resin used at the sugar refining step. In some alternatives, following the WAC neutralization step, the oligomeric sugar stream is directed to an evaporator, while the xylose rich stream is directed to a sugar crystallizer. In some alternatives, when SSMB is used for fractionation, xylose exits from the extract flow and the higher sugars, as well as, glucose, galactose and arabinose exit from the raffinate flow. The xylose stream can optionally be further refined by contacting with granulated activated carbon and/or a mixed bed resin prior to evaporation to higher concentration. The refined xylose stream is then optionally evaporated again and crystallized. The products are xylose crystal and xylose-removed hemicellulose sugar mixture Pure xylose is known to crystallize out of supersaturated mixed sugar solutions. To achieve that, the sugar solution stream resulting from the sugar refining is concentrated by evaporation and fractionated by chromatographic separation to produce a xylose-enriched stream having more than 75, 78, 80, 82, 84, 85, 86, 88, 90% xylose, or a percent within a range defined by any two of the aforementioned percentages, and a xylose-removed hemicellulose sugar mixture. The xylose-enriched stream coming out of fractionation is fed into a crystallization module to produce xylose crystals.

In some methods, the xylose-enriched stream is optionally further evaporated before it is fed into a crystallization module to produce xylose crystals. The crystals can be harvested from the mother liquor by any suitable means, e.g., centrifugation. Depending on the crystallization technique, the crystals can be washed with the appropriate solution, e.g., an aqueous solution or solvent. The crystals can be either dried or re-dissolved in water to make xylose syrup. Typically a yield of 45-60% of the potential xylose can be crystallized in a 20-35, preferably 24-28 hour cycle.

After crystallization, the mother liquor hemicellulose sugar mixture can be recycled back to the fractionation step as it contains a very high content of xylose, e.g., >57% xylose, >65% and more typically >75% xylose. Alternatively, the mother liquor hemicellulose sugar mixture can be recycled for further rounds of hydrolysis. The section below describes some of the products that are made available by virtue of the refinement processes described herein.

Products

In some alternatives, the desired product is the resulting sugar stream obtained from one or more of the refinement processes described herein, in particular, a sugar mixture having a greater amount or weight percentage monomeric sugar, as compared to oligomeric sugar. In some products, the sugar mixture comprises a monosaccharides to total dissolved sugars ratio that is larger than or equal to 0.50, 0.60, 0.70, 0.75, 0.80, 0.85, 0.90, or 0.95 weight/weight or a ratio within a range defined by any two of the aforementioned ratios. In some embodiments, the product is a sugar mixture having a reduced amount of glucose. In some sugar mixtures, the glucose to total monosaccharides ratio is less than 0.25, 0.20, 0.15, 0.13, 0.10, 0.06, 0.05, 0.03, or 0.02 weight/weight or a ratio within a range defined by any two of the aforementioned ratios. In some embodiments, the product is a sugar mixture with enriched xylose content. In some products, the xylose to total monosaccharides ratio is larger than 0.10, 0.15, 0.18, 0.20, 0.30, 0.40, 0.50, 0.60, 0.70, 0.80 or 0.85 weight/weight or a ratio within a range defined by any two of the aforementioned ratios.

In some sugar mixtures, the fructose to total dissolved sugars ratio is less than 0.02, 0.03, 0.04, 0.05, 0.06, 0.07, 0.08, 0.09, 0.10, 0.15, 0.20, 0.25 or 0.30 weight/weight or a ratio within a range defined by any two of the aforementioned ratios. In some sugar mixtures, the fructose to total dissolved sugars ratio is larger than 0.001, 0.002, 0.005, 0.006, 0.007, 0.008, 0.009, 0.01, 0.02, 0.03, 0.04, 0.05, 0.06, 0.07, 0.08, or 0.09 weight/weight or a ratio within a range defined by any two of the aforementioned ratios.

These sugar mixtures desirably contain a low concentration of impurities (e.g., furfurals and phenols). In some products, the sugar mixture has furfurals in an amount up to 0.1%, 0.05%, 0.04%, 0.03%, 0.04%, 0.01%, 0.075%, 0.005%, 0.004%, 0.002%, or 0.001% weight/weight or an amount within a range defined by any two of the aforementioned amounts. In some products, the sugar mixture has phenols in an amount up to 500 ppm, 400 ppm, 300 ppm, 200 ppm, 100 ppm, 60 ppm, 50 ppm, 40 ppm, 30 ppm, 20 ppm, 10 ppm, 5 ppm, 1 ppm, 0.1 ppm, 0.05 ppm, 0.02 ppm, or 0.01 ppm or an amount within a range defined by any two of the aforementioned amounts.

The aforementioned high purity sugar solution products can be used to produce additional industrial products and consumer products, such as the products described in PCT/IL2011/00509 (herein, expressly incorporated by reference in its entirety), e.g., fermentation products, such as feed. In some embodiments, the sugars produced by the exemplary methods described herein are incorporated into a fermentation product as described in the following US Patents, the contents of each of which are hereby expressly incorporated by reference in their entireties: U.S. Pat. Nos. 7,678,768; 7,534,597; 7,186,856; 7,144,977; 7,019,170; 6,693,188; 6,534,679; 6,452,051; 6,361,990; 6,320,077; 6,229,046; 6,187,951; 6,160,173; 6,087,532; 5,892,109; 5,780,678; and 5,510,526.

Fermentation products include at least one member selected from the group consisting of alcohols, carboxylic acids, amino acids, monomers for the polymer industry and proteins, wherein the method further comprises processing said fermentation product to produce a product selected from the group consisting of detergent, polyethylene-based products, polypropylene-based products, polyolefin-based products, polylactic acid (polylactide)-based products, polyhydroxyalkanoate-based products and polyacrylic-based products. These fermentation products may be used alone or with other components as food or feed, pharmaceuticals, nutraceuticals, plastic parts or components to make various consumer products, fuel, gasoline, chemical additive or surfactant. The aforementioned high purity sugar solution products are also suitable for chemical catalytic conversions since catalysts are usually sensitive to impurities associated with biomass and sugar degradation products.

In some alternatives, the high purity sugar product obtained by one or more of the processes described herein can be used in a fermentation process. Such fermentation process may employ a microorganism or genetically modified microorganism (GMO) from the genera *Clostridium, Escherichia* (e.g., *Escherichia coli*), *Salmonella, Zymomonas, Rhodococcus, Pseudomonas, Bacillus, Enterococcus, Alcaligenes, Lactobacillus, Klebsiella, Paenibacillus, Corynebacterium, Brevibacterium, Pichia, Candida, Hansenula* and *Saccharomyces*. Hosts that may be particularly of interest include *Oligotropha carboxidovorans, Escherichia coli, Bacillus licheniformis, Paenibacillus macerans, Rhodococcus erythropolis, Pseudomonas putida, Lactobacillus plantarum, Enterococcus faecium, Cupriavidus necator, Enterococcus gallinarium, Enterococcus faecalis, Bacillus subtilis* and *Saccharomyces cerevisiae*. Also, any of the known strains of these species may be utilized as a starting microorganism. Optionally, the microorganism may be an actinomycete selected from *Streptomyces coelicolor, Streptomyces lividans, Streptomyces hygroscopicus*, or *Saccharopolyspora erytraea*. In various exemplary embodiments, the microorganism can be a eubacterium selected from

*Pseudomonas fluorescens, Pseudomonas aeruginosa, Bacillus subtilis* or *Bacillus cereus*. In some examples, the microorganism or genetically modified microorganism is a gram-negative bacterium.

Conversion products made through fermentation can be, for example, an alcohol, carboxylic acid, amino acid, monomer for the polymer industry or protein. A particular example is lactic acid, which is the monomer building polylactic acid, a polymer with numerous uses. The conversion product can be processed to produce a consumer product selected from the group consisting of a detergent, a polyethylene-based product, a polypropylene-based product, a polyolefin-based product, a polylactic acid (polylactide)-based product, a polyhydroxyalkanoate-based product and a polyacrylic-based product. The detergent can include a sugar-based surfactant, a fatty acid-based surfactant, a fatty alcohol-based surfactant or a cell-culture derived enzyme.

In some embodiments, the conversion product can be, for example, an alcohol, carboxylic acid, amino acid, monomer for the polymer industry or protein. In some embodiments, the conversion product is processed to produce a consumer product selected from the group consisting of a detergent, a polyethylene-based product, a polypropylene-based product, a polyolefin-based product, a polylactic acid (polylactide)-based product, a polyhydroxyalkanoate-based product and a polyacrylic-based product. Optionally, the detergent includes a sugar-based surfactant, a fatty acid-based surfactant, a fatty alcohol-based surfactant or a cell-culture derived enzyme. Optionally, the polyacrylic-based product is a plastic, a floor polish, a carpet, a paint, a coating, an adhesive, a dispersion, a flocculant, an elastomer, an acrylic glass, an absorbent article, an incontinence pad, a sanitary napkin, a feminine hygiene product and a diaper. Optionally, the polyolefin-based products is a milk jug, a detergent bottle, a margarine tub, a garbage container, a plumbing pipe, an absorbent article, a diaper, a non-woven, an HDPE toy or an HDPE detergent packaging. Optionally, the polypropylene based product is an absorbent article, a diaper or a non-woven. Optionally, the polylactic acid based product is a packaging of an agriculture product or of a dairy product, a plastic bottle, a biodegradable product or a disposable. Optionally, the polyhydroxyalkanoate based products is packaging of an agriculture product, a plastic bottle, a coated paper, a molded or extruded article, a feminine hygiene product, a tampon applicator, an absorbent article, a disposable non-woven or wipe, a medical surgical garment, an adhesive, an elastomer, a film, a coating, an aqueous dispersant, a fiber, an intermediate of a pharmaceutical or a binder. The conversion product can also be ethanol, butanol, isobutanol, a fatty acid, a fatty acid ester, a fatty alcohol or biodiesel. The sugar products generated by one or more of the processes described herein can be converted to fuel products, for example, an isobutene condensation product, jet fuel, gasoline, gasohol, diesel fuel, drop-in fuel, diesel fuel additive or a precursor thereof. This conversion may be done through fermentation or by catalyzed chemical conversion. The gasohol may be ethanol-enriched gasoline and/or butanol-enriched gasoline.

The consumer product may have a ratio of carbon–14 to carbon–12 of about $2.0 \times 10^{13}$ or greater. The consumer product can include an ingredient of a consumer product as described above and an additional ingredient produced from a raw material other than lignocellulosic material. In some cases, ingredient and the additional ingredient produced from a raw material other than lignocellulosic material are essentially of the same chemical composition. The consumer product can include a marker molecule at a concentration of at least 100 ppb. The marker molecule can be, for example, hexanol, 1-ethyl hexanol, furfural or hydroxymethylfurfural, products of furfural or hydroxymethylfurfural condensation, color compounds derived from sugar caramelization, levulinic acid, acetic acid, methanol, galacturonic acid or glycerol.

Consumer products, precursors of a consumer product or an ingredient of a consumer product can also be produced from the lignin stream. In some embodiments, the consumer product is characterized by an ash content of less than 0.5% wt and/or by a carbohydrates content of less than 0.5% wt and/or by a sulfur content of less than 0.1% wt and/or by an extractives content of less than 0.5% wt. In some embodiments, the consumer product produced from the lignin stream includes one or more of bio-oil, carboxylic and fatty acids, dicarboxylic acids, hydroxylcarboxylic, hydroxyldicarboxylic acids and hydroxyl-fatty acids, methylglyoxal, mono-, di- or poly-alcohols, alkanes, alkenes, aromatics, aldehydes, ketones, esters, biopolymers, proteins, peptides, amino acids, vitamins, antibiotics, and pharmaceuticals. In some embodiments, the consumer product includes one or more of dispersants, emulsifiers, complexants, flocculants, agglomerants, pelletizing additives, resins, carbon fibers, active carbon, antioxidants, liquid fuel, aromatic chemicals, vanillin, adhesives, binders, absorbents, toxin binders, foams, coatings, films, rubbers and elastomers, sequestrants, fuels, and expanders. In some embodiments, the product is used in an area selected from the group consisting of food, feed, materials, agriculture, transportation and construction. Optionally, the consumer product has a ratio of carbon–14 to carbon–12 of about $2.0 \times 10^{-13}$ or greater.

The xylose obtained by any one or more of the processes described herein can be used as a raw material for bacterial and chemical production of furfural and tetrahydrofuran. Xylose can also be used as the starting material for preparing xylitol, a low calorie alternative sweetener that has beneficial properties for dental care and diabetes management, and has been shown to contribute to clearing ear and upper respiratory tract infections. Given these beneficial properties, xylitol is incorporated in food and beverages, toothpastes and mouth wash products, chewing gums and confectionary products. World xylitol market is limited due to its high price compared to other non-reducing polyol sugars (e.g., sorbitol, mannitol).

The xylose obtained by one or more of the processes described herein can also be reacted with chlorambucil to obtain benzenebutanoic acid, 4-[bis(2-chloroethyl)amino]-, 2-P-D-xylopyranosylhydrazide, a glycosylated chlorambucil analog which is useful as antitumor and/or anti-metastatic agent. Xylose may be reacted with phenethyl bromide and 1-bromo-3,3-dimethoxypropane to obtain (2S,3S,4S)-2H-Pyrrole, 3,4-dihydro-3,4-bis(phenyl-methoxy)-2-[(phenyl-methoxy)methyl]-, 1-oxide, used as α-glucosidase inhibitor for preventing and/or treating diabetes mellitus, hyperlipidemia, neoplasm, and viral infection. The following examples are provided to illustrate aspects of the invention further but are not intended to limit the scope of the invention.

EXAMPLES

It is understood that the examples and embodiments described herein are for illustrative purposes only and are not intended to limit the scope of the claimed invention. It is also understood that various modifications or changes in light the examples and embodiments described herein will be suggested to persons skilled in the art and are to be included within the spirit and purview of this application and scope of the appended claims. All publications, patents, and patent applications cited herein are hereby incorporated by reference in their entirety for all purposes.

Example 1

Extraction of Xylose with a Thermally-Phase Separable Solvent

Pre-hydrolysis liquid was mixed with an equal volume of either 2-butoxyethanol (EB), or 1-propoxy-2-propanol (PP) as an extraction solvent. The obtained homogeneous liquid was heated to higher than the lower critical solubility temperature of the said mixture e.g. 60° C. to induce the phase separation. The phases were separated and water phase was subjected to UPLC analysis.

The purity of xylose was analyzed by LC method using Waters Acuity UPLC system equipped with BEH C18 1.7 um, 2.1*50 mm and running 95:5 MeOH/$H_2O$ as eluent.

Figure 6:
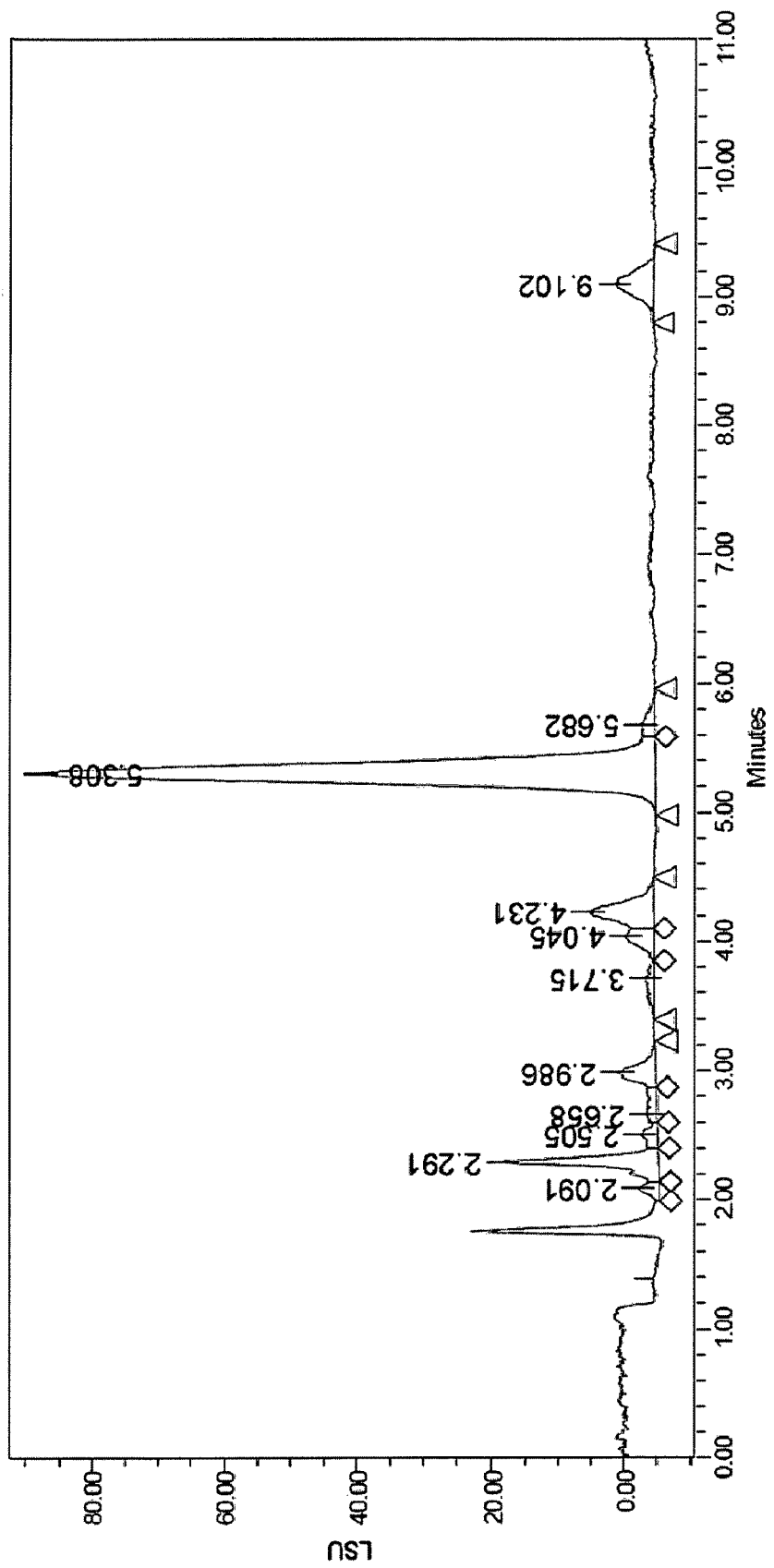
FIG. 6 is a chromatogram of the water phase obtained after extraction with EB.

The chromatogram of the water phase obtained after extraction with EB is shown in FIG. 6. The purity of the xylose is 66%.

Figure 7:
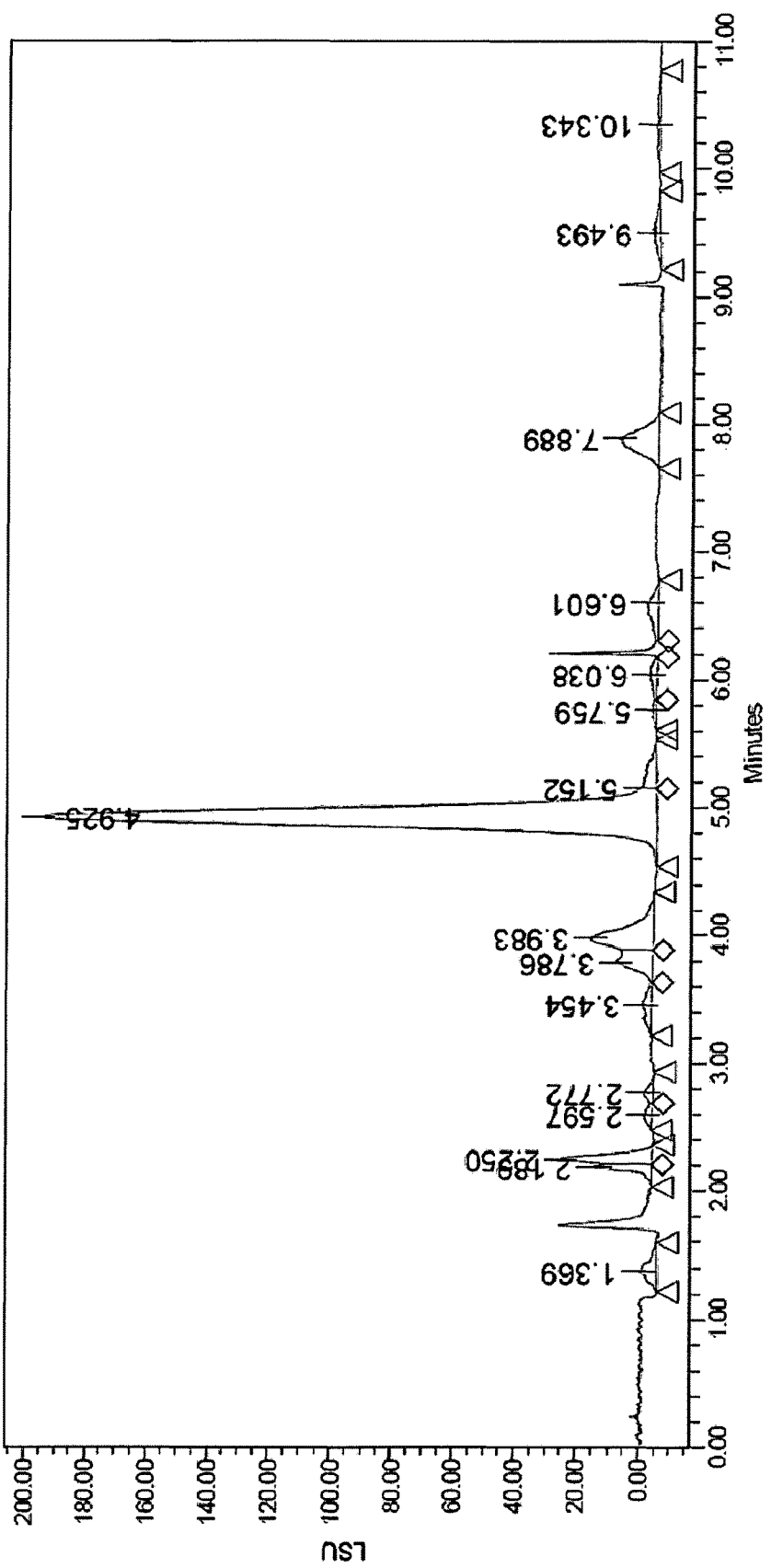
FIG. 7 is a chromatogram of the water phase obtained after extraction with PP.

The chromatogram of the water phase obtained after extraction with PP is shown in FIG. 7. The purity of the xylose is 66%.

Recycling of these solvents was achieved by vacuum distillation. The level of the vacuum depends on the solvent used. The boiling points of the used solvent extracted from literature are 169° C. for EB and 140° C. for PP.

Figure 8:
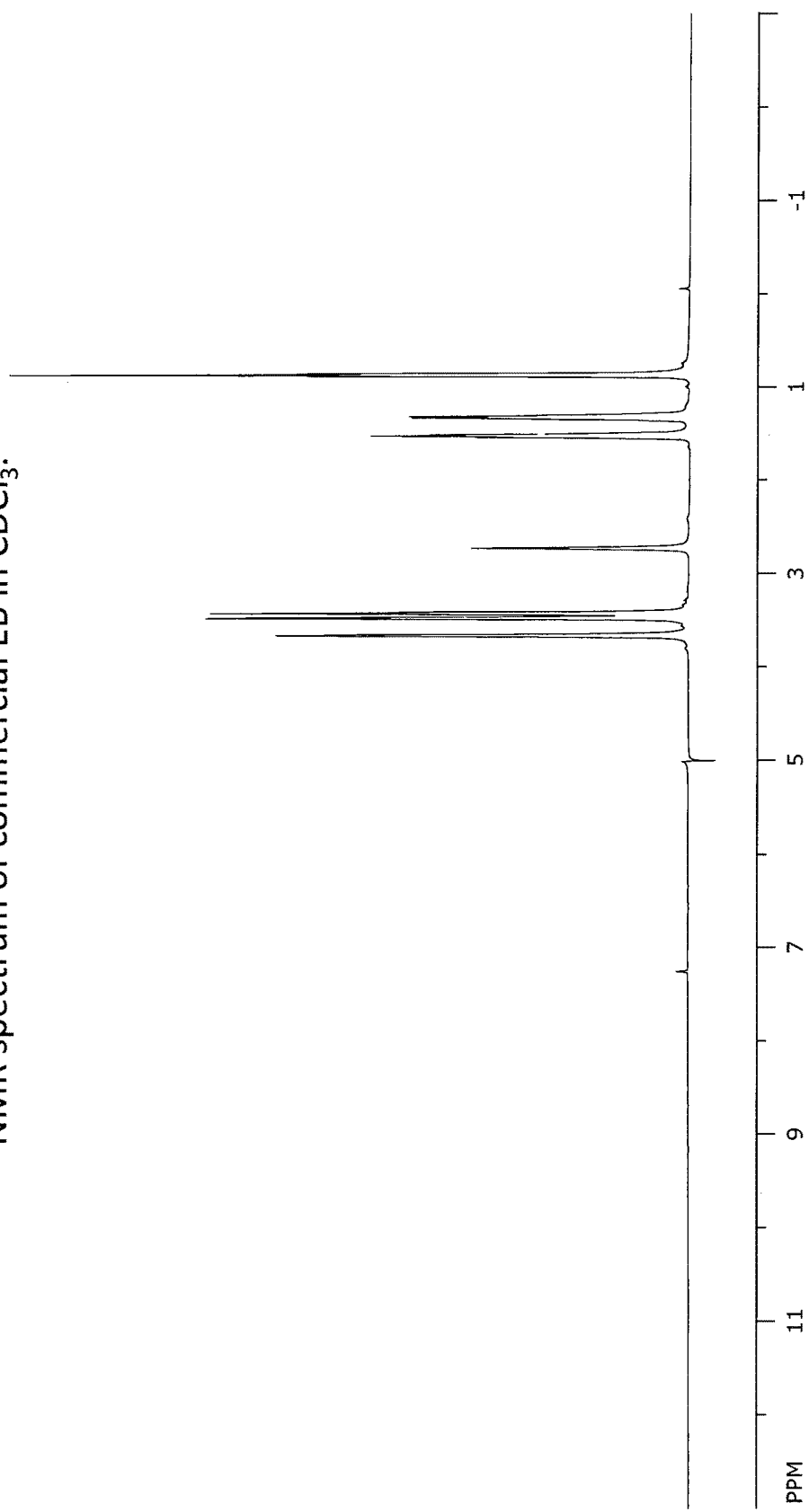
FIG. 8 is an NMR spectrum of commercial EB in $CDCl_3$.
Figure 9:
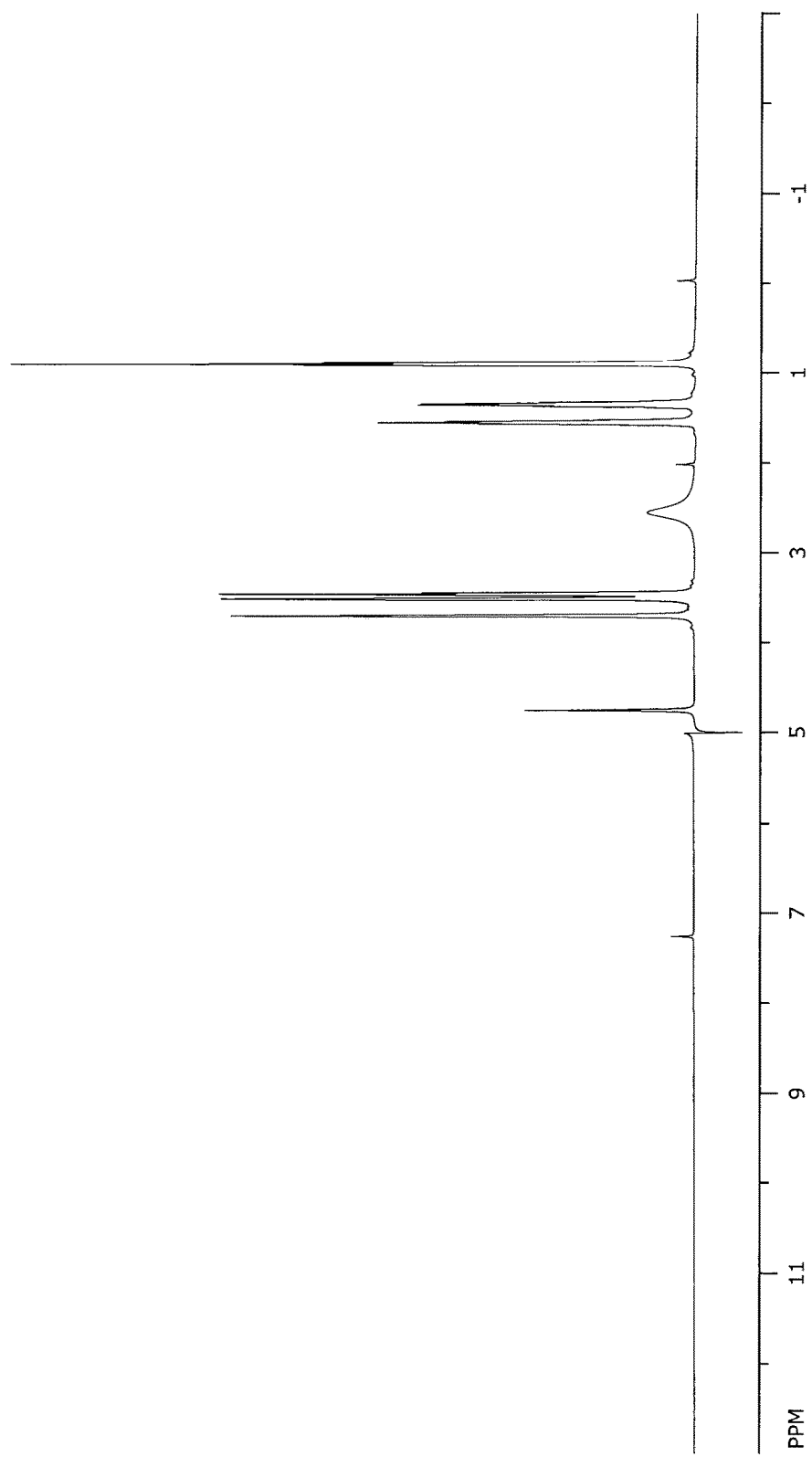
FIG. 9 is an NMR spectrum of recycled and distilled EB in $CDCl_3$.
Figure 10:
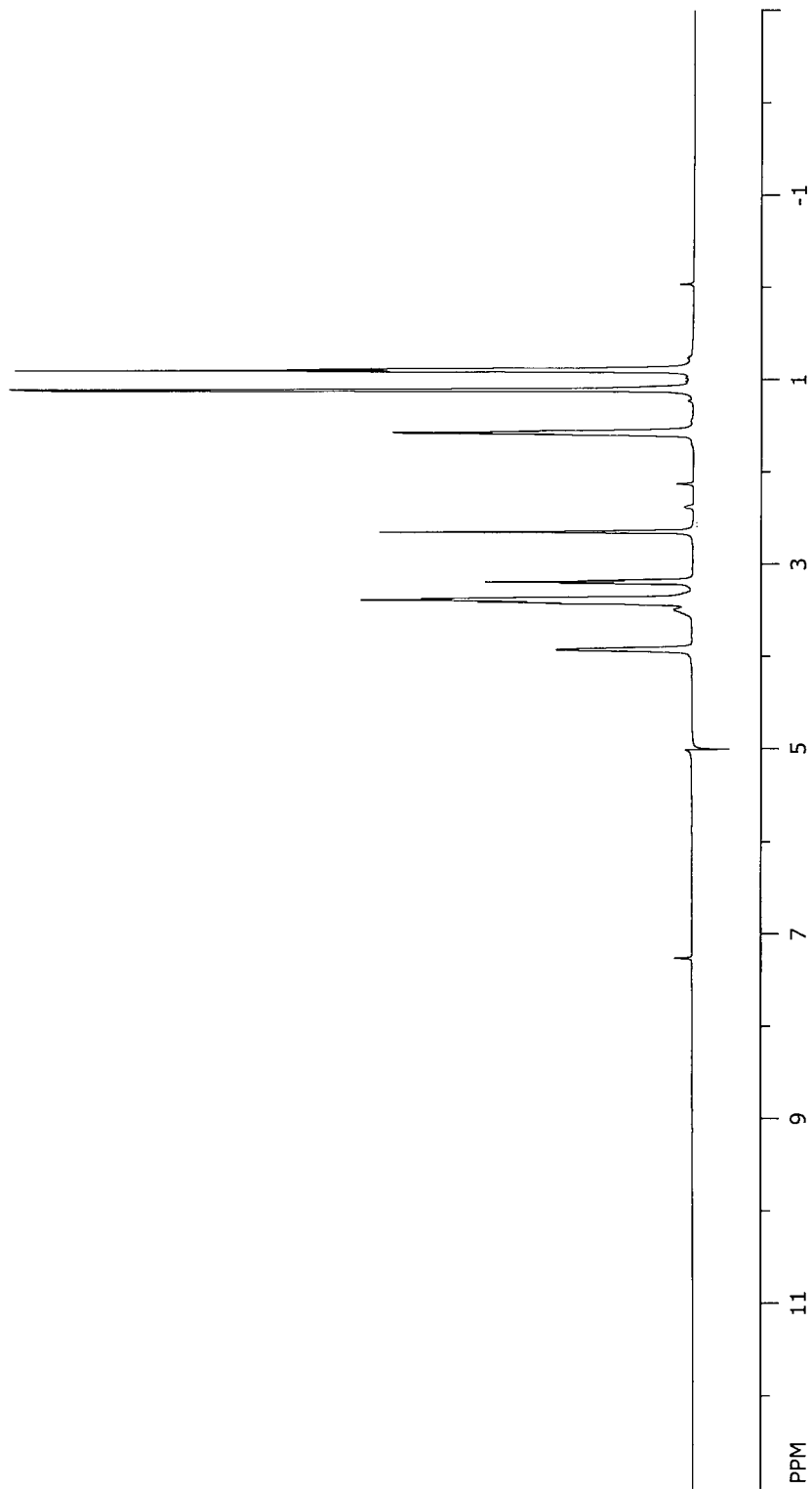
FIG. 10 is an NMR spectrum of commercial PP in $CDCl_3$.
Figure 11:
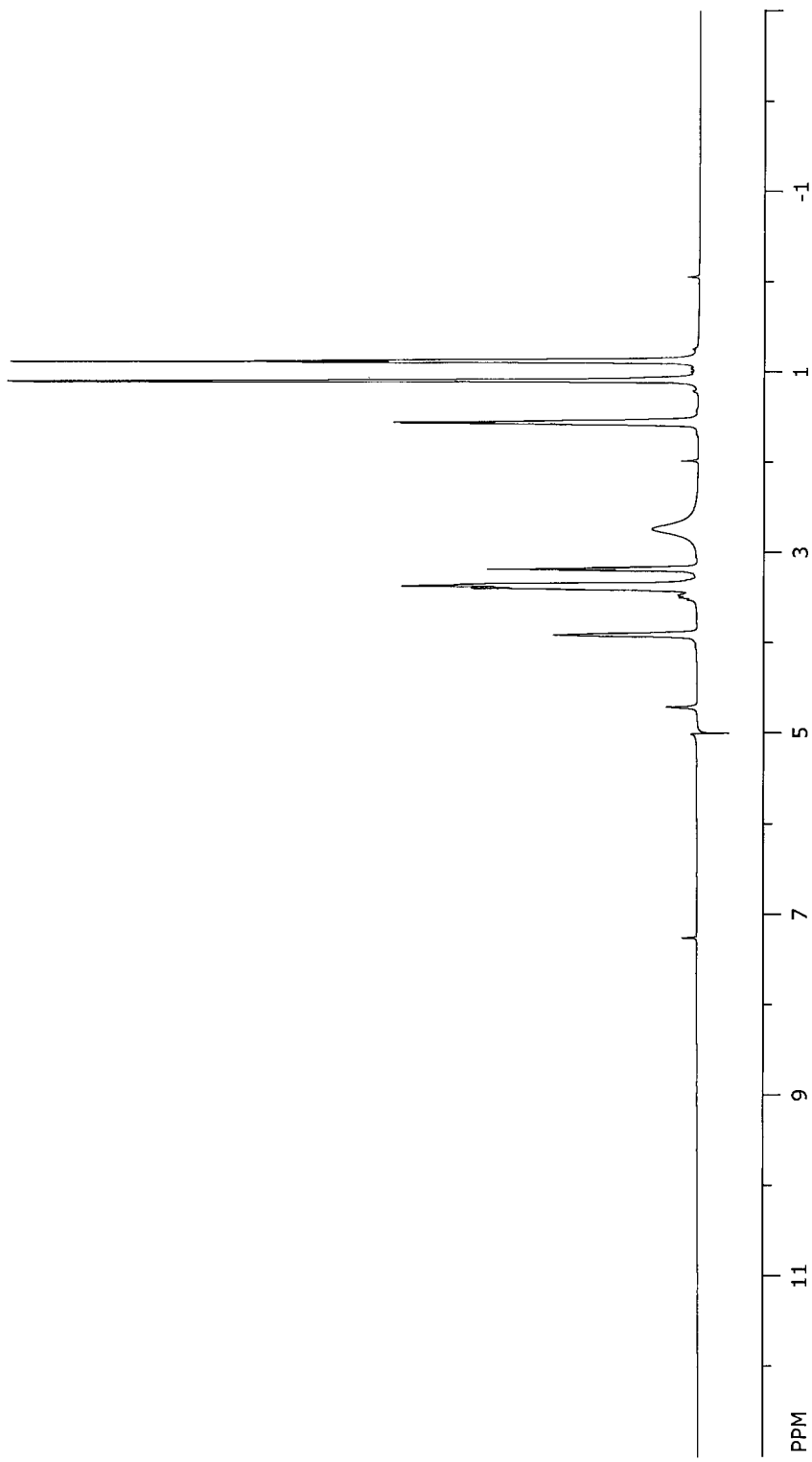
FIG. 11 is an NMR spectrum of recycled and distilled EB in CDCl$_3$.

The NMR spectrum of commercial EB in $CDCl_3$ is shown in FIG. 8. The NMR spectrum of recycled and distilled EB in $CDCl_3$ is shown in FIG. 9. The NMR spectrum of commercial PP in $CDCl_3$ is shown in FIG. 10. The NMR spectrum of recycled and distilled EB in $CDCl_3$ is shown in FIG. 11.

Figure 12:
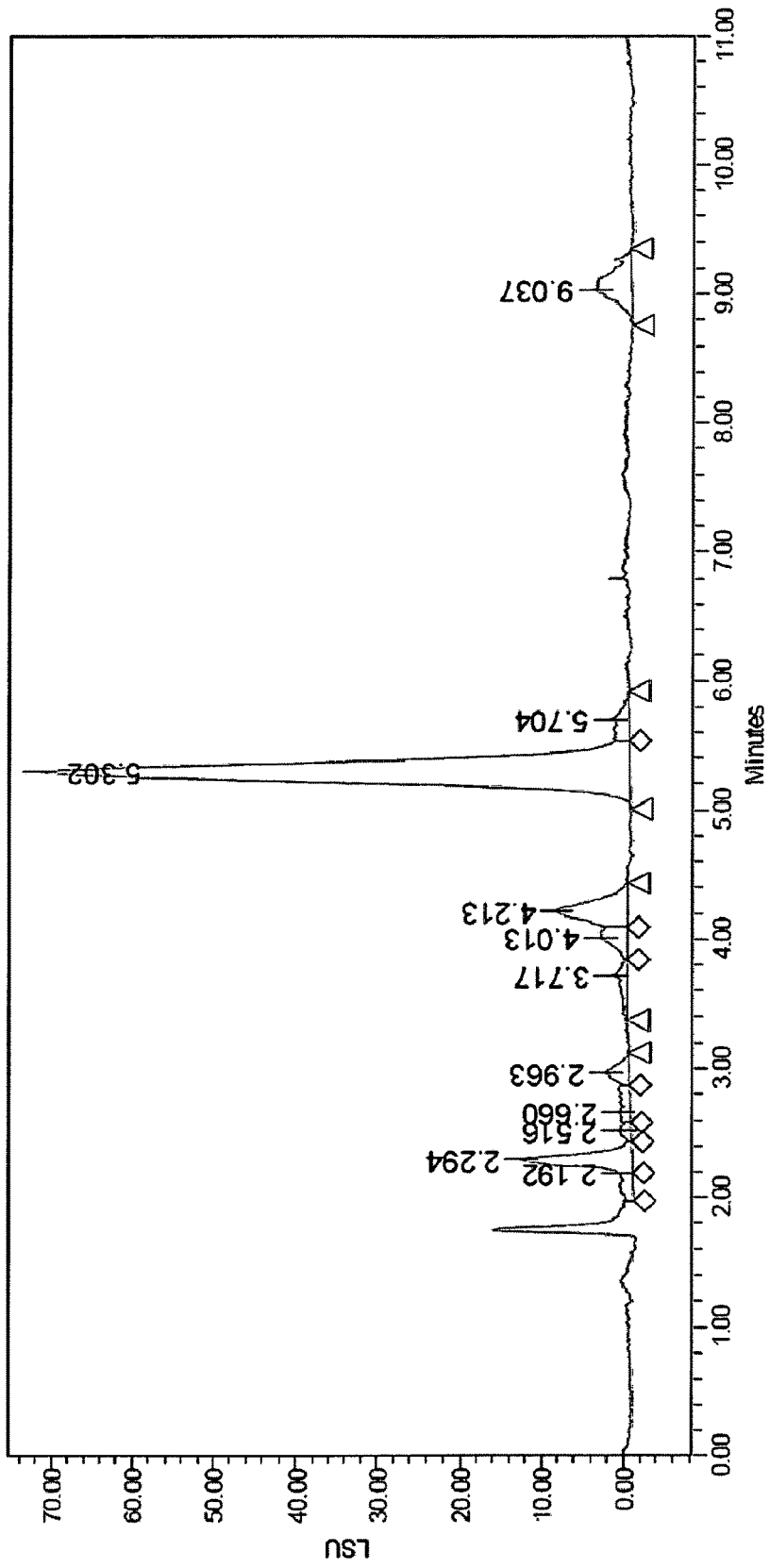
FIG. 12 is a chromatogram of pre-hydrolysis mixture after EB extraction using recycled solvent.

The chromatogram of pre-hydrolysis mixture after EB extraction using recycled solvent is shown in FIG. 12. The purity of the xylose is 66%.

Figure 13:
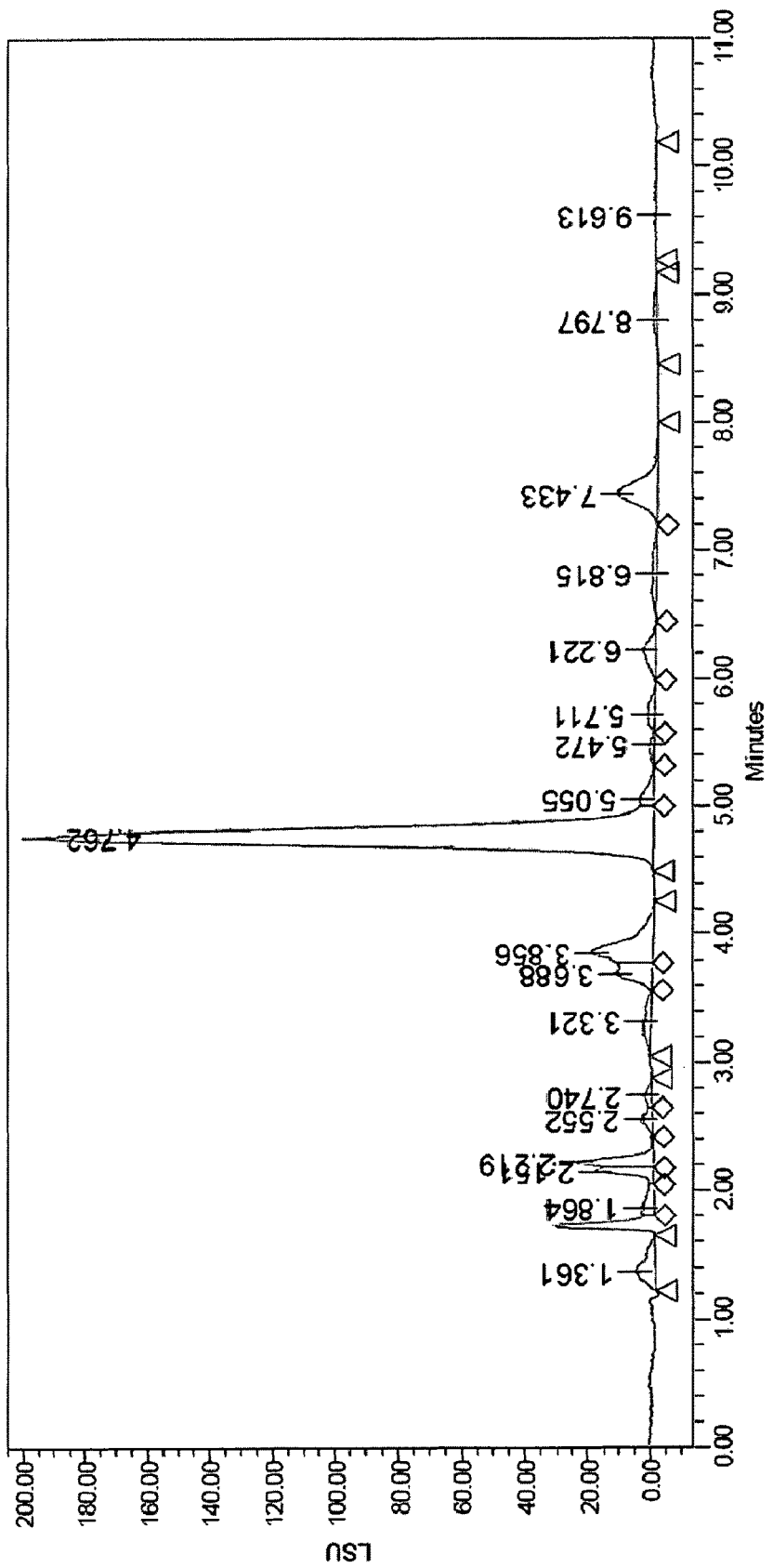
FIG. 13 is a chromatogram of pre-hydrolysis mixture after PP extraction using recycled solvent.

The chromatogram of pre-hydrolysis mixture after PP extraction using recycled solvent is shown in FIG. 13. The purity of the xylose is 63%.

Although the invention has been described with reference to embodiments and examples, it should be understood that various modifications can be made without departing from the spirit of the invention. Accordingly, the invention is limited only by the following claims. All references cited herein are hereby expressly incorporated by reference in their entireties.

The invention claimed is:

1. A method of generating a refined a sugar stream that comprises xylose from a biomass hydrolysis solution, comprising:
    (i) contacting a biomass hydrolysis solution that comprises a population of mixed sugars comprising xylose, an acid, and impurities, with a thermally-phase separable solvent to form an extraction mixture; and
    (ii) separating, by inducing a phase separation with an increased temperature, from said extraction mixture a first stream comprising the thermally-phase separable solvent, acid, and impurities and a second, refined sugar stream that comprises xylose.

2. The method of claim 1, further comprising, contacting said biomass hydrolysis solution with a strong acid cation exchange resin prior to step (i).

3. The method of claim 2, further comprising, contacting said biomass hydrolysis solution, which comprises said population of mixed sugars comprising xylose with a weak base anion exchange resin after said biomass hydrolysis solution is contacted with said strong acid cation exchange resin and prior to step (i).

4. The method of claim 1, wherein the mixture is heated to a temperature of 30-100° C. to induce the phase separation.

5. The method of claim 1, further comprising separating said second, refined sugar stream that comprises xylose by SSMB or SMB chromatography.

6. The method of claim 1, wherein the thermally-phase separable solvent is either an ethylene glycol ether, propylene glycol ether, or a combination thereof.

7. The method of claim 6, wherein the thermally-phase separable solvent is 2-butoxyethanol.

8. The method of claim 6, wherein the thermally-phase separable solvent is 1-propoxy-2-propanol.

9. The method of claim 1, wherein the acid is sulfuric acid.

10. The method of claim 1, wherein the acid is hydrochloric acid.

11. The method of claim 1, wherein an exogenous acid has not been added.

12. The method of claim 1, further comprising isolating, evaporating, purifying or concentrating the xylose from the refined sugar stream that comprises xylose.

13. The method of claim 12, wherein said xylose has a purity of 75%-96%.

14. The method of claim 13, wherein said xylose has a purity of 80%-96%.

* * * * *